(12) United States Patent
Long et al.

(10) Patent No.: US 11,017,154 B2
(45) Date of Patent: *May 25, 2021

(54) METHODS AND SYSTEMS FOR IDENTIFYING STYLES OF PROPERTIES OF DOCUMENT OBJECT MODEL ELEMENTS OF AN INFORMATION RESOURCE

(71) Applicant: Google LLC, Mountain View, CA (US)

(72) Inventors: Thomas James Worthington Long, London (GB); Willa Angel Chen, Palo Alto, CA (US); Nathan Peter Lucash, San Francisco, CA (US); Johan Land, Santa Clara, CA (US); Daniel William Kaemmerer, San Francisco, CA (US); Lingxing Yuan, Milpitas, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/736,562

(22) Filed: Jan. 7, 2020

(65) Prior Publication Data

US 2020/0143106 A1 May 7, 2020

Related U.S. Application Data

(63) Continuation of application No. 16/101,079, filed on Aug. 10, 2018, now Pat. No. 10,536,354, which is a
(Continued)

(51) Int. Cl.
*G06F 40/143* (2020.01)
*G06F 40/14* (2020.01)
(Continued)

(52) U.S. Cl.
CPC ............ *G06F 40/14* (2020.01); *G06F 40/103* (2020.01); *G06F 40/154* (2020.01); *H04L 43/04* (2013.01)

(58) Field of Classification Search
CPC ...... G06F 40/14; G06F 40/143; G06F 40/154; G06F 40/103; H04L 43/04
See application file for complete search history.

(56) References Cited

U.S. PATENT DOCUMENTS

| | | |
|---|---|---|
| 8,165,915 B1 | 4/2012 | Lucash |
| 8,374,935 B1 | 2/2013 | Lucash |

(Continued)

OTHER PUBLICATIONS

Final Office Action for U.S. Appl. No. 14/480,089 dated Oct. 3, 2017 (14 pages).
(Continued)

*Primary Examiner* — Keith D Bloomquist
(74) *Attorney, Agent, or Firm* — Foley and Lardner LLP

(57) ABSTRACT

Systems and methods of automatically detecting styles of properties of DOM elements of an information resource are disclosed. A data processing system including one or more processors can identify an information resource for which to automatically detect styles of properties used to style primary content of the information resource, identify at least one DOM container that contains at least a portion of the primary content, determine, for each of one or more DOM elements included in the DOM container, styles of properties corresponding to a respective DOM element, store, in a memory, the determined styles of properties corresponding to the respective DOM elements included in the DOM container and use the stored styles of properties to modify third-party content to be inserted within the information resource.

20 Claims, 8 Drawing Sheets

Related U.S. Application Data continuation of application No. 14/480,089, filed on Sep. 8, 2014, now Pat. No. 10,050,849.

(60) Provisional application No. 62/034,364, filed on Aug. 7, 2014.

(51) Int. Cl.
  *G06F 40/103* (2020.01)
  *G06F 40/154* (2020.01)
  *H04L 12/26* (2006.01)

(56) References Cited

U.S. PATENT DOCUMENTS

| | | | |
|---|---|---|---|
| 8,650,107 | B1 | 2/2014 | Lucash |
| 2008/0140626 | A1 | 6/2008 | Wilson |
| 2012/0110437 | A1* | 5/2012 | Pan .................. G06F 16/9574 715/235 |
| 2013/0246909 | A1* | 9/2013 | Carroll .................. G06F 40/14 715/235 |
| 2014/0046980 | A1* | 2/2014 | Kleinschmidt ......... G06F 40/14 707/793 |
| 2014/0101539 | A1 | 4/2014 | Ma et al. |
| 2014/0229296 | A1 | 8/2014 | Ye et al. |

OTHER PUBLICATIONS

Non-Final Office Action for U.S. Appl. No. 14/480089 dated May 4, 2017 (11 pages).

Non-Final Office Action for U.S. Appl. No. 16/101,079 dated Apr. 19, 2019 (11 pages).

Notice of Allowance for U.S. Appl. No. 14/480,089 dated Apr. 23, 2019 (5 pages).

Notice of Allowance for U.S. Appl. No. 16/101,079 dated Sep. 10, 2019 (5 pages).

* cited by examiner

500

```
IDENTIFY AN INFORMATION RESOURCE FOR WHICH TO AUTOMATICALLY DETECT STYLE PROPERTIES
USED TO STYLE PRIMARY CONTENT OF THE INFORMATION RESOURCE
505
```

↓

```
IDENTIFY AT LEAST ONE DOCUMENT OBJECT MODEL (DOM) CONTAINER THAT CONTAINS AT LEAST A
PORTION OF THE PRIMARY CONTENT
510
```

↓

```
DETERMINE, FOR EACH OF ONE OR MORE DOM ELEMENTS INCLUDED IN THE DOM CONTAINER, A SET
OF STYLE PROPERTIES CORRESPONDING TO A RESPECTIVE DOM ELEMENT
515
```

↓

```
STORE, IN A MEMORY, THE DETERMINED SETS OF STYLE PROPERTIES CORRESPONDING TO THE
RESPECTIVE DOM ELEMENTS INCLUDED IN THE DOM CONTAINER
520
```

↓

```
USE THE STORED SETS OF STYLE PROPERTIES TO MODIFY THIRD-PARTY CONTENT TO BE INSERTED
WITHIN THE INFORMATION RESOURCE
525
```

FIG. 5

METHODS AND SYSTEMS FOR IDENTIFYING STYLES OF PROPERTIES OF DOCUMENT OBJECT MODEL ELEMENTS OF AN INFORMATION RESOURCE

CROSS-REFERENCE TO RELATED APPLICATIONS

The present application claims priority under 35 U.S.C. § 120 to U.S. patent application Ser. No. 16/101,079, titled "Methods and Systems for Identifying Styles of Properties of Document Object Model Elements of An Information Resource," filed on Aug. 10, 2018, which claims priority under 35 U.S.C. § 120 to U.S. patent application Ser. No. 14/480,089, titled "Methods and Systems for Identifying Styles of Properties of Document Object Model Elements of An Information Resource," filed on Sep. 8, 2014, which claims priority under 35 U.S.C. 119(e) to U.S. Provisional Patent Application No. 62/034,364, titled "Methods and Systems for Identifying Styles of Properties of Document Object Model Elements of An Information Resource," filed on Aug. 7, 2014, the entirety of each of which is incorporated herein by reference.

BACKGROUND

Information resources, such as web pages, can include primary content and content slots that serve as placeholders for third-party content items, such as creatives. When the web page is rendered on a user computing device, third-party content items are inserted in the content slots and provided for display alongside the primary content. The content slots in which third-party content items are inserted are typically defined manually in the web page code.

SUMMARY

At least one aspect is directed to a method of generating a stable identifier for nodes likely to include primary content of an information resource. A processor identifies, on an information resource, a plurality of content-related Document Object Model (DOM) nodes based on a primary content detection policy including one or more rules. The processor determines one or more container nodes containing one or more of the identified content-related DOM nodes. The processor generates, for each of the container nodes, one or more identifiers corresponding to the container node. The processor then determines, for each of the generated identifiers, one or more container nodes to which the identifier corresponds. The processor identifies, from the generated identifiers, a subset of the generated identifiers that correspond only to container nodes that contain the content-related DOM nodes and selects one of the identifiers of the subset as a stable identifier.

In some implementations, the processor determines, for a content-related DOM node of the plurality of content-related DOM nodes, a container node of the container nodes that is nearest to the content-related DOM node contained by the container node. In some implementations, the processor determines the container node nearest to the content-related DOM node by identifying one or more container nodes that either i) start with a title, or ii) the node is a member of a cascading style sheet (CSS) class that indicates that the node is a post; and the node either i) has a tag name that includes ARTICLE, or ii) the node has a tag name that includes DIV, INS or TD and the node has at least one stable class name.

In some implementations, the stable class name includes any class name that does not end in a number.

In some implementations, selecting one of the identifiers of the subset as the stable identifier includes identifying an identifier of the subset including only a tag name. In some implementations, selecting one of the identifiers of the subset as the stable identifier includes determining, for each identifier of the subset, a content identification score indicating an ability of the identifier to identify primary content on the information resource based on a number of contents of the container nodes to which the identifier of the subset is associated and selecting, based on the content identification scores of the identifiers of the subset, one of the identifiers of the subset as the stable identifier.

In some implementations, determining the content identification score of each identifier of the subset includes determining a first number of characters in paragraphs included within the container nodes associated with the identifier of the subset and a second number of characters included within the container nodes associated with the identifier of the subset. In some implementations, determining the content identification score of each identifier of the subset includes determining a first number of paragraphs included within the container nodes associated with the identifier of the subset and a second number of paragraphs included within the information resource. In some implementations, determining the content identification score of each identifier of the subset includes determining a first number of characters in paragraphs included within the container nodes associated with the identifier of the subset and a second number of characters included within all paragraphs included within the information resource.

In some implementations, the processor stores the identity of the stable identifier with the information resource. In some implementations, the processor inserts a creative in between adjacent container nodes corresponding to the stable identifier responsive to receiving a request to serve the information resource.

In some implementations, the processor can determine, from the generated identifiers, a subset of the generated identifiers corresponding only to container nodes that contain the content-related DOM nodes and selects one of the identifiers of the subset as a stable identifier.

According to another aspect, a system for generating a stable identifier for nodes likely to include primary content of an information resource includes a data processing system configured to identify, on an information resource, a plurality of content-related Document Object Model (DOM) nodes based on a primary content detection policy including one or more rules, determine one or more container nodes container nodes containing one or more of the identified content-related DOM nodes, generate, for each of the container nodes, one or more identifiers corresponding to the container node, determine, for each of the generated identifiers, one or more container nodes to which the identifier corresponds, identify, from the generated identifiers, a subset of the generated identifiers that correspond only to container nodes that contain the content-related DOM nodes and select one of the identifiers of the subset as a stable identifier.

In some implementations, the processor determines, for a content-related DOM node of the plurality of content-related DOM nodes, a container node of the container nodes that is nearest to the content-related DOM node contained by the container node. In some implementations, the processor determines the container node nearest to the content-related DOM node by identifying one or more container nodes that either i) start with a title, or ii) the node is a member of a cascading style sheet (CSS) class that indicates that the node is a post; and the node either i) has a tag name that includes ARTICLE, or ii) the node has a tag name that includes DIV, INS or TD and the node has at least one stable class name. In some implementations, the stable class name includes any class name that does not end in a number.

In some implementations, selecting one of the identifiers of the subset as a stable identifier includes identifying an identifier of the identifier of the subset including only a tag name. In some implementations, selecting one of the identifiers of the subset as the stable identifier includes determining, for each identifier of the subset, a content identification score indicating an ability of the identifier to identify primary content on the information resource based on a number of contents of the container nodes to which the identifier of the subset is associated and selecting, based on the content identification scores of the identifiers of the subset, one of the identifiers of the subset as the stable identifier.

In some implementations, determining the content identification score of each identifier of the subset includes determining a first number of characters in paragraphs included within the container nodes associated with the identifier of the subset and a second number of characters included within the container nodes associated with the identifier of the subset. In some implementations, determining the content identification score of each identifier of the subset includes determining a first number of paragraphs included within the container nodes associated with the identifier of the subset and a second number of paragraphs included within the information resource. In some implementations, determining the content identification score of each identifier of the subset includes determining a first number of characters in paragraphs included within the container nodes associated with the identifier of the subset and a second number of characters included within all paragraphs included within the information resource.

In some implementations, the processor stores the identity of the stable identifier with the information resource. In some implementations, the processor inserts a creative in between adjacent container nodes corresponding to the stable identifier responsive to receiving a request to serve the information resource.

In some implementations, the processor can determine, from the generated identifiers, a subset of the generated identifiers corresponding only to container nodes that contain the content-related DOM nodes and selects one of the identifiers of the subset as a stable identifier.

According to another aspect, a computer-readable storage medium has computer-executable instructions, which when executed by a computer, cause the computer to identify, on an information resource, a plurality of content-related Document Object Model (DOM) nodes based on a primary content detection policy including one or more rules, determine one or more container nodes container nodes containing one or more of the identified content-related DOM nodes, generate, for each of the container nodes, one or more identifiers corresponding to the container node, determine, for each of the generated identifiers, one or more container nodes to which the identifier corresponds, identify, from the generated identifiers, a subset of the generated identifiers that correspond only to container nodes that contain the content-related DOM nodes and select one of the identifiers of the subset as a stable identifier.

According to another aspect, a method of automatically detecting styles of properties of document object model (DOM) elements of an information resource is described. One or more processors identify an information resource for which to automatically detect styles of properties used to style primary content of the information resource. The processors identify at least one Document Object Model (DOM) container that contains at least a portion of the primary content. The processors determine, for each of one or more DOM elements included in the DOM container, styles of properties corresponding to a respective DOM element. The processors store, in a memory, the determined styles of properties corresponding to the respective DOM elements included in the DOM container. The processors then use the stored styles of properties to modify third-party content to be inserted within the information resource.

In some implementations, identifying the information resource for which to automatically detect styles of properties includes identifying, from a log, a plurality of information resources on which third-party content was served and selecting, from the identified information resources, the information resource for which to automatically detect the style. In some implementations, thee processors can identify the one or more DOM elements included in the DOM container. The one or more DOM elements can include a header element, a paragraph element, and a link element.

In some implementations, the processors can determine, from the DOM element corresponding to a header element of the primary content, whether the header element includes a link. The processors can insert, responsive to determining that the header element does not include a link, a link in the header element. The processors can determine styles of properties associated with the header element in which the link is inserted and store the determined style property associated with the header element in which the link is inserted in the memory.

In some implementations, the processors can identify the one or more DOM elements included in the DOM container. The processors can determine, for each of the one or more identified DOM elements, a type of DOM element. The processors can then determine, based on the type of DOM element, styles of properties of the DOM element. In some implementations, the styles of properties include at least one of a font-family, font-size, font-weight, color, text-align, text-decoration, or line-height.

In some implementations, the processors can determine, from a DOM element corresponding to the DOM container, that the DOM element does not define one or more styles of properties of a border. The processors can identify, from a descendant of the DOM element, that the descendants of the DOM element define the styles of properties of the border and set the styles of properties of the border of the descendant of the DOM element as the styles of properties of the border for the DOM element corresponding to the DOM container.

In some implementations, using the stored styles of properties to modify third-party content to be inserted within the information resource includes identifying, by the processors, a third-party content item to serve at the information resource, identifying, from an identifier of the information resource, the stored styles of properties of the DOM elements included in the DOM container of the information resource, generating, from the third-party content item, a DOM node including a plurality of DOM elements that represent the content of the third-party content item, the DOM elements including styles of properties that match the identified styles of properties of corresponding DOM elements included in the DOM container of the information resource, inserting the DOM node in a DOM tree of the information resource and providing, to a computing device on which to render the information resource including the generated third-party content item, the DOM tree of the information resource including the DOM node corresponding to the third-party content item.

According to another aspect, a system for automatically detecting styles of properties of document object model (DOM) elements of an information resource includes a data processing system having one or more processors. The processors identify an information resource for which to automatically detect styles of properties used to style primary content of the information resource. The processors identify at least one Document Object Model (DOM) container that contains at least a portion of the primary content. The processors determine, for each of one or more DOM elements included in the DOM container, styles of properties corresponding to a respective DOM element. The processors store, in a memory, the determined styles of properties corresponding to the respective DOM elements included in the DOM container. The processors then use the stored styles of properties to modify third-party content to be inserted within the information resource.

According to another aspect, a computer-readable storage medium has computer-executable instructions, which when executed by a computer, cause the computer to identify an information resource for which to automatically detect styles of properties used to style primary content of the information resource, identify at least one Document Object Model (DOM) container that contains at least a portion of the primary content, determine, for each of one or more DOM elements included in the DOM container, styles of properties corresponding to a respective DOM element, store, in a memory, the determined styles of properties corresponding to the respective DOM elements included in the DOM container and then use the stored styles of properties to modify third-party content to be inserted within the information resource.

foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings:

FIG. 5 is a flow diagram depicting one implementation of the steps taken to automatically identify styles of properties of DOM elements of the information resource.

DETAILED DESCRIPTION

Figure 1:
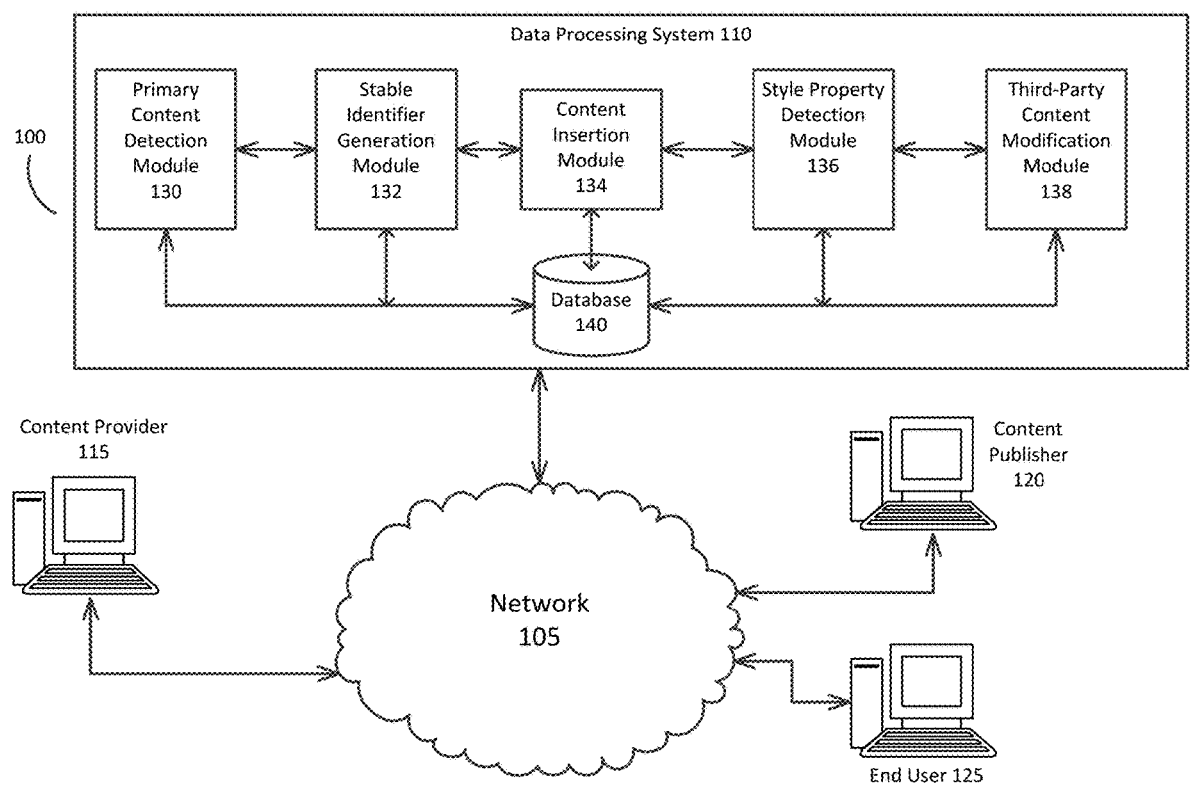
FIG. 1 is a block diagram depicting one implementation of an environment for automatically generating a stable identifier for primary content detected within an information resource and automatically identifying styles of properties of Document Object Model (DOM) elements of the information resource, according to an illustrative implementation.

Following below are more detailed descriptions of various concepts related to, and implementations of, methods, apparatus, and systems for automatically generating a stable identifier for primary content detected within an information resource and automatically identifying styles of properties of Document Object Model (DOM) elements of the information resource. The various concepts introduced above and discussed in greater detail below may be implemented in any of numerous ways, as the described concepts are not limited to any particular manner of implementation. Examples of specific implementations and applications are provided primarily for illustrative purposes.

One aspect of the present disclosure relates to generate a stable identifier for primary content detected within an information resource. By detecting primary content, such as posts or articles, within an information resource, a data processing system can generate a stable identifier for the detected primary content. The stable identifier can be used to reference primary content on future renderings of the information resource. For example, once the data processing system generates a stable identifier for the primary content included in the information resource, the data processing system can dynamically insert creatives in the information resource when the information resource is rendered at a computing device. Details relating to generating a stable identifier for primary content detected within an information resource are provided below with respect to Section A.

Another aspect of the present disclosure relates to automatically detecting styles of properties of DOM elements of an information resource. A data processing system including one or more processors can identify an information resource for which to automatically detect styles of properties used to style primary content of the information resource, identify at least one DOM container that contains at least a portion of the primary content, determine, for each of one or more DOM elements included in the DOM container, styles of properties corresponding to a respective DOM element, store, in a memory, the determined styles of properties corresponding to the respective DOM elements included in the DOM container and use the stored styles of properties to modify third-party content to be inserted within the information resource. Details relating to automatically detecting styles of properties of DOM elements of an information resource are provided below with respect to Section B.

A. Generating a Stable Identifier for Primary Content Detected within an Information Resource Information resources are often very complicated. For example, many information resources include numerous images and distinct sections of text. The information resources can include menus, headers, sidebars, footers, ads, widgets as well as what might be considered the actual primary content. Although a user viewing the information resource can easily differentiate these different parts of the information resource and focus on the primary content, the process of automatically detecting primary content included in an information resource is much more challenging.

Primary content on information resources, such as web pages, can often be presented in one of two forms. In one form, the primary content can be presented as a list of posts. Each post is its own distinct piece of content about a certain subject, but together the posts make up the primary content of the web page. Conversely, in another form, the primary content can be presented as a single long form post or article.

Once the primary content on an information resource is identified, the primary content may generally be contained in a container associated with a stable identifier. The present disclosure provides methods and systems for automatically generating stable identifiers for the detected primary content of an information resource. The generated stable identifiers can be used to insert content slots for serving creatives or third-party content items on the information resource.

The present disclosure provides methods and systems for automatically detecting these pieces of primary content. With respect to the first form in which the content is presented as a list of posts, each of the posts may be identified as a distinct piece of content. Conversely, with respect to the second form in which the content is presented as a single post or article, the whole of the primary content should be detected as a single piece of content.

In addition to detecting the primary content, the present disclosure provides methods and systems for generating a stable identifier for the detected primary content. For example, each of the posts that together form the primary content, can be wrapped in an <ARTICLE class='post'> tag in the HTML source, so a stable identifier might be {tagName: 'ARTICLE', className: 'post'}. Using the second form in which the content is presented as a single post or article as another example, the post or article can be wrapped in a <DIV class='story-body'> tag in the HTML source, so a stable identifier might be {tagName: 'DIV', className: 'story-body'}.

These identifiers allow the posts or articles on a web page to be very quickly and efficiently accessed by JavaScript once the page has been rendered in a browser. This allows for creatives to be inserted within the primary content of a page dynamically. In one example, a creative can be inserted after the first paragraph of each post when the web page is presenting the primary content as a list of posts. In another example, a creative can be inserted after the first three paragraphs of an article when the web page is presenting the primary content as a single piece of content.

The present disclosure relates to methods and systems for generating stable identifiers for content sections of an information resource. A processor can be configured to identify, on an information resource, a plurality of content-related Document Object Model (DOM) nodes likely to include primary content based on an identifier associated with the nodes, determine one or more container nodes containing one or more of the identified content-related DOM nodes, generate, for each of the container nodes, one or more identifiers corresponding to the container node, determine, from the generated identifiers, one or more potential identifiers corresponding only to container nodes that contain the content-related DOM nodes and select one of the potential identifiers as a stable identifier.

FIG. 1 illustrates an system 100 for generating a stable identifier for primary content detected within an information resource via at least one computer network, such as the network 105. The network 105 can include computer networks such as the internet, local, wide, metro or other area networks, intranets, satellite networks, other computer networks such as voice or data mobile phone communication networks, and combinations thereof. The system 100 can also include at least one data processing system 110, e.g., at least one logic device such as a computing device or server having a processor to communicate via the network 105, for instance with at least one content provider computing device 115, at least one content publisher computing device 120, or at least one end user computing device 125.

The data processing system 110 can include at least one server. For instance, the data processing system 110 can include a plurality of servers located in at least one data center or server farm. In some implementations, the data processing system 110 includes a content placement system, e.g., an ad server or ad placement system. The data processing system 110 can include at least one primary content detection module 130, at least one stable identifier generation module 132, at least one content insertion module 134, at least one style property detection module 136, at least one third-party content modification module 138 and at least one database 140. The primary content detection module 130, the stable identifier generation module 132, the content insertion module 134, the style property detection module 136 and the third-party content modification module 138 can each include at least one processing unit, server, virtual server, circuit, engine, agent, appliance, or other logic device such as programmable logic arrays configured to communicate with the database 140 and with other computing devices (e.g., the content provider computing device 115, the content publisher computing device 120, or the end user computing device 125) via the network 105.

The primary content detection module 130, the stable identifier generation module 132, the content insertion module 134, the style property detection module 136 and the third-party content modification module 138 can include or execute at least one computer program or at least one script. The primary content detection module 130, the stable identifier generation module 132, the content insertion module 134, the style property detection module 136 and the third-party content modification module 138 can be separate components, a single component, or part of the data processing system 110. The primary content detection module 130, the stable identifier generation module 132, the content insertion module 134, the style property detection module 136 and the third-party content modification module 138 can include combinations of software and hardware, such as one or more processors configured to execute one or more scripts to identify, on an information resource, a plurality of content-related Document Object Model (DOM) nodes likely to include primary content, determine one or more container nodes container nodes containing one or more of the identified content-related DOM nodes, generate, for each of the container nodes, one or more identifiers corresponding to the container node, determine, from the generated identifiers, one or more potential identifiers corresponding only to container nodes that contain the content-related DOM nodes and select one of the potential identifiers as a stable identifier, for instance.

The content provider computing devices 115 can include servers or other computing devices operated by a content provider entity to provide content items such as advertisements for display on information resources at the end user computing device 125. The content provided by the content provider computing device 115 can include third party content items or creatives (e.g., ads) for display on information resources such as a website or web page that includes primary content, e.g. content provided by the content publisher computing device 120. The content items can also be displayed on a search results web page. For instance, the content provider computing device 115 can provide or be the source of ads or other content items for display in content slots of content web pages such as a web page of a company where the primary content of the web page is provided by the company, or for display on a search results landing page provided by a search engine. The content items associated with the content provider computing device 115 can be displayed on information resources other than web pages, such as content displayed as part of the execution of an application on a smartphone or other end user computing device 125.

The content publisher computing devices 120 can include servers or other computing devices operated by a content publishing entity to provide primary content for display via the network 105. For instance, the content publisher computing device 120 can include a web page operator who provides primary content for display on the web page. The primary content can include content other than that provided by the content publisher computing device 120, and the web page can include content slots configured for the display of third party content items (e.g., ads) from the content provider computing devices 115. For instance, the content publisher computing device 120 can operate the website of a company and can provide content about that company for display on web pages of the website. The web pages can include content slots configured for the display of third party content items such as ads of the content provider computing device 115. In some implementations, the content publisher computing device 120 includes a search engine computing device (e.g. server) of a search engine operator that operates a search engine website. The primary content of search engine web pages (e.g., a results or landing web page) can include results of a search as well as third party content items displayed in content slots such as content items from the content provider computing device 115.

The end user computing devices 125 can include computing devices configured to communicate via the network 105 to display data such as the content provided by the content publisher computing device 120 (e.g., primary web page content or other information resources) and the content provided by the content provider computing device 115 (e.g., third party content items such as ads configured for display in a content slot of a web page). The end user computing device 125, the content provider computing device 115, and the content publisher computing device 120 can include desktop computers, laptop computers, tablet computers, smartphones, personal digital assistants, mobile devices, end user computing devices, consumer computing devices, servers, clients, and other computing devices. The end user computing device 125, the content provider computing device 115, and the content publisher computing device 120 can include user interfaces such as microphones, speakers, touchscreens, keyboards, pointing devices, a computer mouse, touchpad, or other input or output interfaces.

The content provider computing devices 115, the content publisher computing device 120 and the end user computing devices 125 may be any number of different user electronic devices, for example, a laptop computer, a desktop computer, a tablet computer, a smartphone, a digital video recorder, a set-top box for a television, a video game console, or any other computing device configured to communicate via the network 105. The content provider computing devices 115, the content publisher computing device 120 and the end user computing devices 125 can include a processor and a memory, i.e., a processing circuit. The memory stores machine instructions that, when executed by processor, cause processor to perform one or more of the operations described herein. The processor may include a microprocessor, application-specific integrated circuit (ASIC), field-programmable gate array (FPGA), etc., or combinations thereof. The memory may include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, read-only memory (ROM), random-access memory (RAM), electrically-erasable ROM (EEPROM), erasable-programmable ROM (EPROM), flash memory, optical media, or any other suitable memory from which the processor can read instructions. The instructions may include code from any suitable computer-programming language such as, but not limited to, C, C++, C #, Java, JavaScript, Perl, Python and Visual Basic.

The content provider computing devices 115, the content publisher computing device 120 and the end user computing devices 125 may also include one or more user interface devices. In general, a user interface device refers to any electronic device that conveys data to a user by generating sensory information (e.g., a visualization on a display, one or more sounds, etc.) and/or converts received sensory information from a user into electronic signals (e.g., a keyboard, a mouse, a pointing device, a touch screen display, a microphone, etc.). The one or more user interface devices may be internal to a housing of the content provider computing devices 115, the content publisher computing device 120 and the end user computing devices 125 (e.g., a built-in display, microphone, etc.) or external to the housing of content provider computing devices 115, the content publisher computing device 120 and the end user computing devices 125 (e.g., a monitor connected to the user computing device 115, a speaker connected to the user computing device 115, etc.), according to various implementations. For example, the content provider computing devices 115, the content publisher computing device 120 and the end user computing devices 125 may include an electronic display, which visually displays web pages using webpage data received from one or more content sources and/or from the data processing system 110 via the network 105. In some implementations, a content placement campaign manager or advertiser can communicate with the data processing system 110 via the content provider computing device 115. In some implementations, the advertiser can communicate with the data processing system 110 via a user interface displayed on the user interface devices of the content provider computing device 115.

The primary content detection module 130 can be part of, or can include scripts executed by, one or more servers in the data processing system 110. In some implementations, the primary content detection module 130 can be designed, constructed or configured to identify, on an information resource, a plurality of content-related Document Object Model (DOM) nodes likely to include primary content. Examples of primary content can include posts, articles, or other content items that the web publisher has provided. Examples of content that may not be considered primary content can include advertisements, widgets, or links not related to the primary content. In some implementations, the primary content detection module 130 can be configured to identify all of the content-related Document Object Model (DOM) nodes included in the information resource. In some implementations, the primary content detection module 130 can identify content-related DOM nodes by inspecting the DOM tree of the information resource. The primary content detection module 130 can identify each node included within the information resource and determine whether the identified node is a content-related DOM node.

In some implementations, the primary content detection module 130 can determine that a DOM node is a content-related DOM node based on a primary content detection policy including one or more rules. In some implementations, the primary content detection module 130 can determine that a node is a content-related DOM node if the node is one or more of an effective text node, not an effective link node, contains more than a predetermined number of characters, no ancestor of the node is a paragraph, and either the node's rendered height is greater than or equal to twice the height of a line of text of the paragraph or the previous effective text node in the DOM tree is a title. In some implementations, the primary content detection module 130 can determine that a node is a content-related DOM node if the node contains content corresponding to a post or article, or any other content that the publisher of the information resource considers to be primary content. In some implementations, a node can be defined as an effective text node if the node is a text node containing visible text. In some implementations, a node can be defined as an effective text node if all of the children of the node are inline nodes and at least one of the node's children is an effective text node. In some implementations, a node can be defined as an effective link node if the node is an effective text node that is the descendent of an anchor tag, such as an A tag. In some implementations, the node can be defined as an effective link node if the node has at least one child and all of the node's children are effective links. In some implementations, a node can be defined as a title if the node is an effective text node and the node, or a descendent of the node is a header tag, such as an H1, H2, H3, H4, H5, or H6 tag. In some implementations, a node may be deemed to start with a title if the node is a title. In some implementations, the node may be deemed to start with a title if the node is not a paragraph and a title is encountered before a paragraph is encountered when traversing the node's subtree.

The primary content detection module 130 can be configured to determine, for each content-related DOM node, one or more container nodes containing one or more of the identified content-related DOM nodes. In some implementations, a node of the DOM tree may be identified as a container node if the node meets two criteria. The first criteria is that either the node has a tag type of ARTICLE or the node has a tag type of DIV, INS or TD and the node has at least one stable class name. In some implementations, a class name may be considered stable if the class name does not end in a number. In some implementations, a class name is considered to be stable if it does not match the following regular expression: /^.*[09]+$/. The second criteria is that the node either starts with a title or the node is a member of a Cascading Style Sheet (CSS) class that indicates that that the node is a post. Examples of CSS class types that indicate that the node is a post can include 'post' or 'typepost.'

In some implementations, the primary content detection module 130 can determine, for each of the identified content-related DOM nodes, the container node nearest to the content-related DOM node. In some implementations, the container node nearest to a given content-related DOM node can be the container node that contains the content-related DOM node and no other container nodes that also contain the content-related DOM node. In some implementations, the container node nearest to a given content-related DOM node can be the container node that contains the content-related DOM node and no other container nodes. In some implementations, the primary content detection module 130 can store a record of each identified content-related DOM node and the identity of the nearest container node that contained the identified content-related DOM node.

In some implementations, the primary content detection module 130 can determine any equivalent container node for each container node determined to contain one or more of the identified content-related DOM nodes. In some implementations, a node can be considered to be an equivalent container ancestor node if exactly one of the node's descendants is a container node, the DOM node contains exactly the same set of effective text nodes as the descendent container node and the node meets the two criteria for determining that a node is a container node.

In some implementations, the primary content detection module 130 can maintain a list of container nodes. The primary content detection module 130 can include each of the container nodes determined for each of the content-related DOM nodes in the list. In some implementations, the primary content detection module 130 can also include each of the equivalent container ancestor nodes determined for each container node. In some implementations, the primary content detection module 130 can remove any duplicate nodes from the list such that the list of container nodes includes each of the determined container nodes and any equivalent container ancestor nodes corresponding to the determined container nodes.

The stable identifier generation module 132 can be part of, or can include scripts executed by, one or more servers in the data processing system 110. In some implementations, the stable identifier generation module 132 can be designed, constructed or configured to generate, for each of the container nodes included in the list of container nodes, one or more identifiers corresponding to the container node. In some implementations, the stable identifier generation module 132 can be configured to generate, for each of the container nodes included in the list, every identifier corresponding to the container node.

In some implementations, the stable identifier generation module 132 can generate an identifier based on the type of tag associated with the container node for which the stable identifier generation module 132 is generating the identifier. In some implementations, the stable identifier generation module 132 can generate an identifier based on the class name associated with the container node. In some implementations, the stable identifier generation module 132 can generate the identifier according to an identifier generation policy that includes one or more rules. In some implementations, to generate an identifier for a given container node, the stable identifier generation module 132 identifies the type of tag associated with the container node and a class name associated with the tag. In some implementations, the stable identifier generation module 132 can generate an identifier having only a tag name if the container node corresponds to an ARTICLE tag type. In some implementations, the tag name of the identifier can be ARTICLE. In some implementations, the stable identifier generation module 132 can generate an identifier having a tag name and an ID if the ID is stable. A stable ID can be any ID that does not end in a number In some implementations, the stable identifier generation module 132 can generate an identifier having a tag name and a class name if the container node corresponds to any tag type other than ARTICLE. In some implementations, the identifier can include the tag type and a single stable class name. In some implementations, the stable class name can correspond to a class name that does not end with a number.

In some implementations, the stable identifier generation module 132 can be configured to maintain a list of identifiers generated for the container nodes included in the list of container nodes. In some implementations, the stable identifier generation module 132 may remove any duplicates in the list of identifiers generated for the container nodes.

In some implementations, the stable identifier generation module 132 can be configured to sort the identifiers generated for the container nodes based on a preference policy. In some implementations, the preference policy can include one or more rules for sorting the potential identifiers. Generally, a good identifier generated by the stable identifier generation module 132 should be stable, should reliably identify all container nodes on the information resource that contain the nodes likely to include primary content and should not identify any other nodes included in the information resource. In some implementations, the stable identifier generation module 132 can be configured to compare the identifiers included in the list to sort the identifiers in order of preference.

In some implementations, to execute or implement the preference policy, the stable identifier generation module 132 can compare two or more first determine whether any of the two identifiers includes only a tag name. Identifiers with only a tag name are preferred over identifiers having a tag name and an ID or identifiers having a tag name and a class name. As such, if one of the identifiers has only a tag name, that identifier will be ranked higher than the identifier not having only a tag name. If the stable identifier generation module 132 identifies that none of the identifiers includes only a tag name, the stable identifier generation module 132 determines whether any of the two identifiers includes a tag name and an ID. Identifiers having a tag name and an ID are preferred over identifiers having a tag name without an ID. As such, if one of the identifiers has a tag name and an ID, that identifier will be ranked higher than the identifier not having an ID. If the stable identifier generation module 132 identifies that none of the identifiers includes a tag name and an ID, the stable identifier generation module 132 determines whether any of the two identifiers includes a tag name and a class name. Identifiers having a tag name and a class name are preferred over identifiers having a tag name without a class name. As such, if one of the identifiers has a tag name and a class name, that identifier will be ranked higher than the identifier not having a class name. If the stable identifier generation module 132 identifies that both of the identifiers includes a tag name and a class name, the stable identifier generation module 132 determines which of the identifiers has a more preferred class name. Identifiers having a more preferred class name are preferred over identifiers having a less preferred class name. As such, if one of the identifiers has a tag name and a more preferred class name, that identifier will be ranked higher than the identifier not having the more preferred class name. In some implementations, the class name 'post-container' is more preferred than the class names 'post' and 'type-post' and the class name 'post' is more preferred than the class name 'type-post.' If the stable identifier generation module 132 identifies that none of the identifiers includes a tag name with a preferred class name, the stable identifier generation module 132 determines that the identifier with the longer class name is preferred over an identifier with a shorter class name. As such, the identifier having a longer class name will be ranked higher than the identifier having a shorter class name. For example, an identifier having a tag name DIV and class name 'post' is preferred over an identifier having a tag type DIV and a class name 'another-class-name' since the class name 'post' is a preferred class name. In another example, an identifier having a tag name DIV and class name 'another-class-name' is preferred over an identifier having a tag type DIV and a class name 'class-name' since the class name 'another-class-name' is longer than the class name 'class-name.'

The stable identifier generation module 132 can be configured to associate each of the identifiers generated by the stable identifier generation module 132 to the container nodes determined by the primary content detection module 130. In some implementations, the stable identifier generation module 132 can construct a map that maps each generated identifier to all of the container nodes from which the stable identifier generation module 132 was able to generate the identifier. In some implementations, the identifiers can serve as keys in the constructed map.

In some implementations, the stable identifier generation module 132 can be configured to determine, for each of the generated identifiers, one or more container nodes to which the identifier corresponds. In some implementations, the stable identifier generation module 132 can be configured to perform, for each identifier, a lookup in the DOM tree of the information resource to identify all nodes that are referenced by the identifier. For each of the identified nodes corresponding to the identifier, the stable identifier generation module 132 can determine that the identified node is either in the list of container nodes maintained by the primary content detection module 130 or that the node meets the criteria for being identified as a container node. In response to determining that the identified node is not on the list of container nodes or does not meet the criteria for being identified as a container node, the stable identifier generation module 132 can disregard the identifier as a stable identifier and remove the identifier from the list of identifiers. Conversely, in response to determining that the identified node is either on the list of container nodes or meets the criteria for being identified as a container node, the stable identifier generation module 132 can determine a content identification content identification score for the identifier. The content identification score can indicate how well the identifier identifies posts, articles or other primary content on the information resource. In some implementations, the content identification score can indicate an ability of the identifier to identify primary content.

In some implementations, the stable identifier generation module 132 can be configured to determine the content identification score based on a number of contents of the container nodes to which the identifier is associated. In some implementations, the stable identifier generation module 132 can determine the content identification score of each identifier based on a first number of characters in nodes likely to include primary content that are contained the container nodes associated with the identifier and a second number of characters included within the container nodes associated with the identifier. In some implementations, the stable identifier generation module 132 can determine the content identification score of each identifier based on a first number of nodes likely to include primary content that are contained in the container nodes associated with the identifier and a second number of paragraphs included within the information resource. In some implementations, the stable identifier generation module 132 can determine the content identification score of each identifier based on a first number of characters in nodes likely to include primary content that are contained in the container nodes associated with the identifier and a second number of characters included within all nodes likely to include primary content that are included within the information resource.

In some implementations, the stable identifier generation module 132 can be configured to determine the content identification score based on the following formula:

$$S = \frac{C_{PARA}}{C_{TOTAL}} + K_1 \frac{P_{CONTAINED}}{P_{TOTAL}} + K_2 \frac{D_{CONTAINED}}{D_{TOTAL}}$$

where:
$C_{PARA}$ is the number of characters in nodes likely to include primary content that are contained in container nodes associated with the potential identifier;
$C_{TOTAL}$ is the total number of characters in container nodes associated with the potential identifier;
$P_{CONTAINED}$ is the number of nodes likely to include primary content that are contained in container nodes associated with the potential identifier;
$P_{TOTAL}$ is the total number of nodes likely to include primary content on the information resource;
$D_{CONTAINED}$ is the number of characters contained in nodes likely to include primary content that are contained in container nodes associated with the potential identifier;
$D_{TOTAL}$ is the number of characters contained in all nodes likely to include primary content on the information resource;
$K_1$ is a tunable parameter (for example, 0.5); and
$K_2$ is a tunable parameter (for example, 1).

The stable identifier generation module 132 can be configured to identify the identifier having the largest content identification score. The stable identifier generation module 132 can then select the identifier from the plurality of generated identifiers as the stable identifier for identifying container nodes that contain nodes that are likely to include primary content.

In some implementations, the stable identifier generation module 132 can be configured to store the identified potential identifier with the information resource. In some implementations, the identified potential identifier can be associated with each of the container nodes including primary content. In this way, when the information resource is accessed for rendering at a later time, the identifiers identifying the container nodes including the primary content can be used to easily identify the container nodes including the primary content. In some implementations, creatives can be inserted near the nodes likely to include primary content, thereby improving conversion rates of the creatives.

The content insertion module 134 can be part of, or can include scripts executed by, one or more servers in the data processing system 110. In some implementations, the content insertion module 134 can be designed, constructed or configured to insert a creative between adjacent container nodes that contain nodes likely to include primary content. In some implementations, the content insertion module 134 can identify the container nodes using the stable identifier selected by the stable identifier generation module 132. In some implementations, the content insertion module 134 can request access to the information resource, identify the generated stable identifier and identify the container nodes associated with the generated stable identifier. The content insertion module 134 can then insert creatives adjacent to or near these container nodes. As creatives displayed near primary content tend to have a higher conversion rate, the content insertion module 134 can increase the conversion rates of the creatives inserted the content insertion module 134 on the information resource.

Figure 2A:
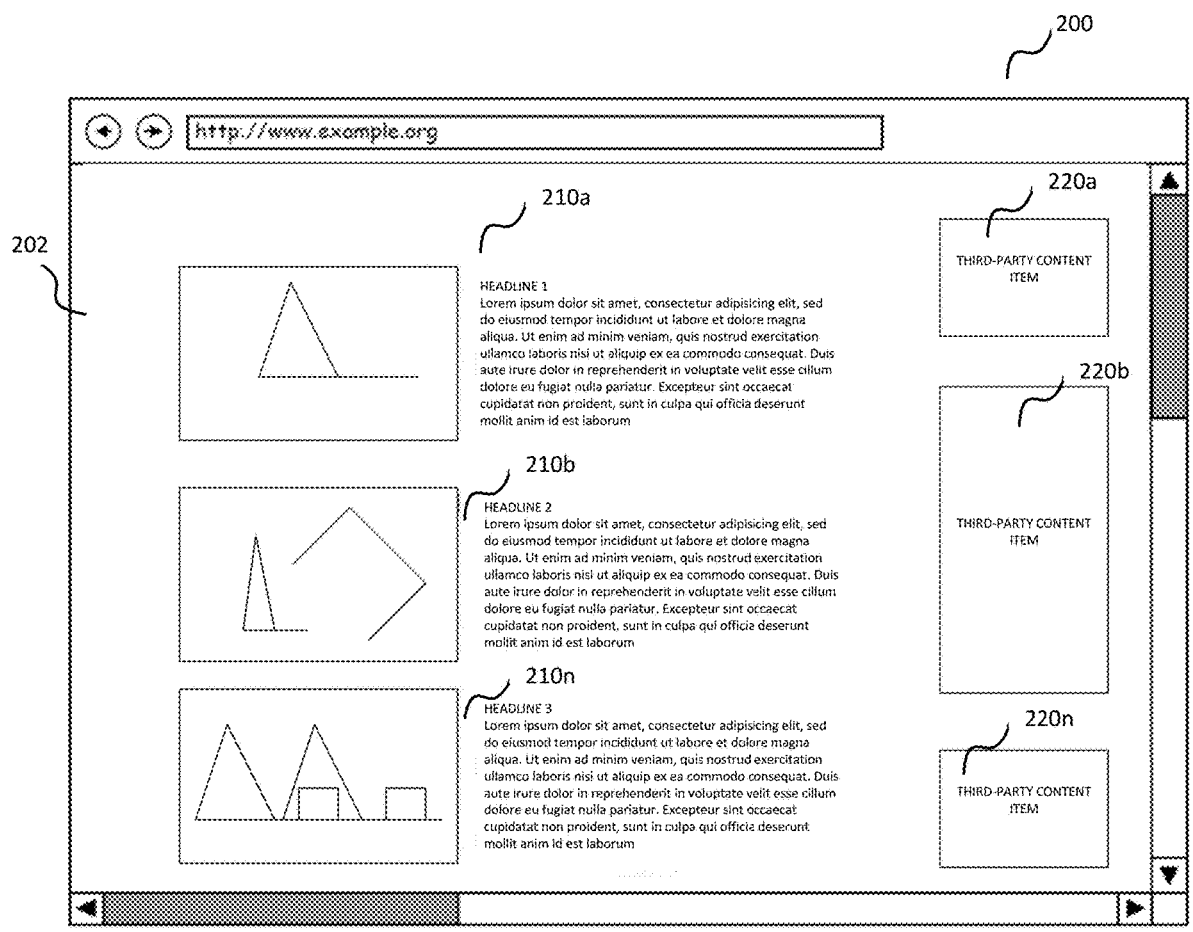
FIG. 2A is a screenshot of a display of an information resource including a plurality of posts.
Figure 2B:
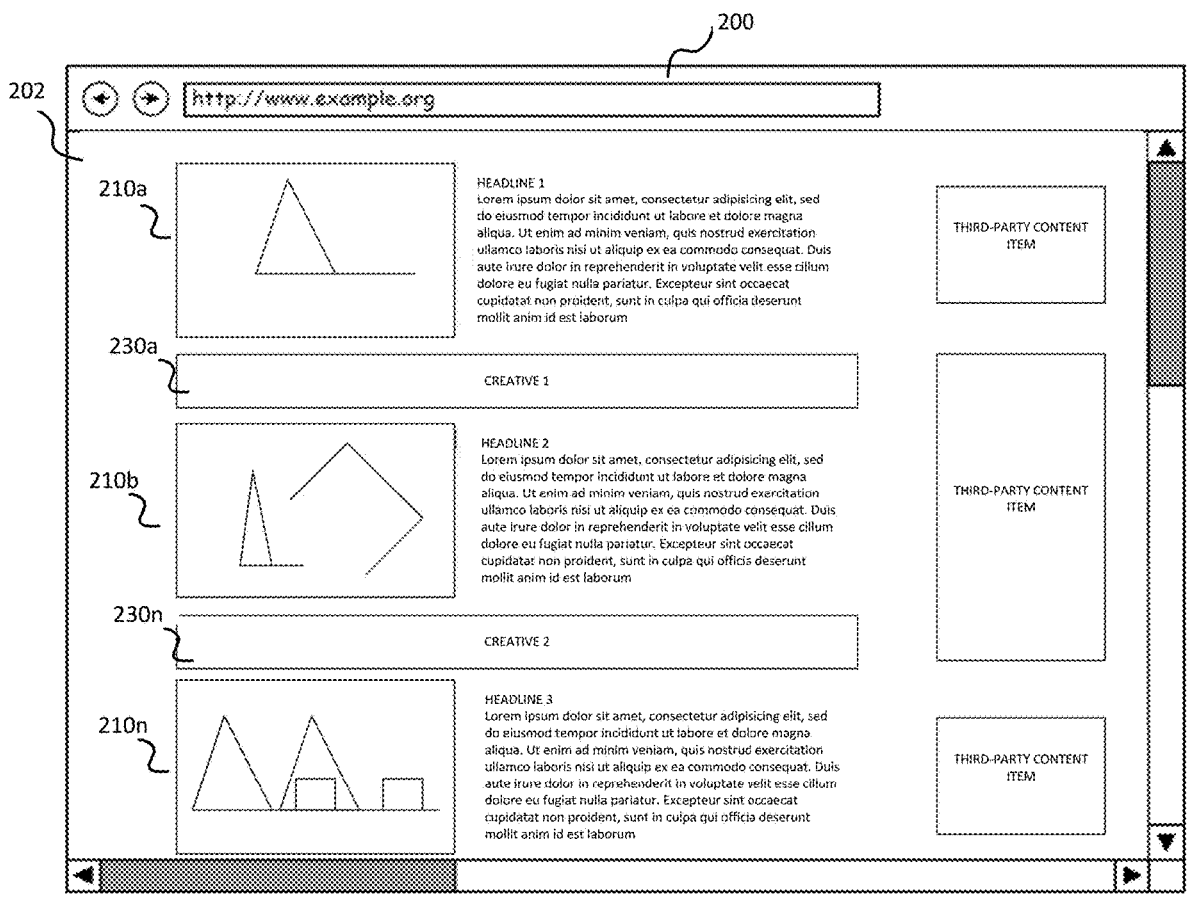
FIG. 2B is a screenshot of a display of the information resource shown in FIG. 2A but including a plurality of creatives inserted between the plurality of posts.

Referring now briefly to FIGS. 2A and 2B, FIG. 2A shows a screenshot 200 of an information resource 202 displayed within a browser window. The information resource 202 includes primary content and third-party content 220a-n. The primary content comprises a plurality of posts 210a-n, each having an associated image, a headline, and corresponding text. The stable identifier generation module 132 described in FIG. 1 can be configured to associate a stable identifier with the DOM tree of the information resource 202 and identify container nodes containing each of the plurality of posts 210a-n. The content insertion module 134 can be configured to use the stable identifier associated with the information resource 202 to insert creatives in between the plurality of posts 210a-n. FIG. 2B shows a screenshot of the information resource shown in FIG. 2A that includes creatives 230a-n between the plurality of posts 210a-n.

In some implementations, the content insertion module 134 can be configured to include a script or other software construct in the DOM tree of the information resource such that when the information resource is rendered on a browser executing on a computing device, the information resource is rendered with creatives inserted in between adjacent posts of the information resource. In some implementations, the browser can execute the script or software construct to identify the container nodes corresponding to the stable identifier, insert creative slots and cause creatives to be retrieved for insertion in the creative slots. In some implementations, the content insertion module 134 can be configured to cause the information resource to render on the browser such that creatives are displayed in slots positioned between adjacent posts or near one or more posts.

Figure 3A:
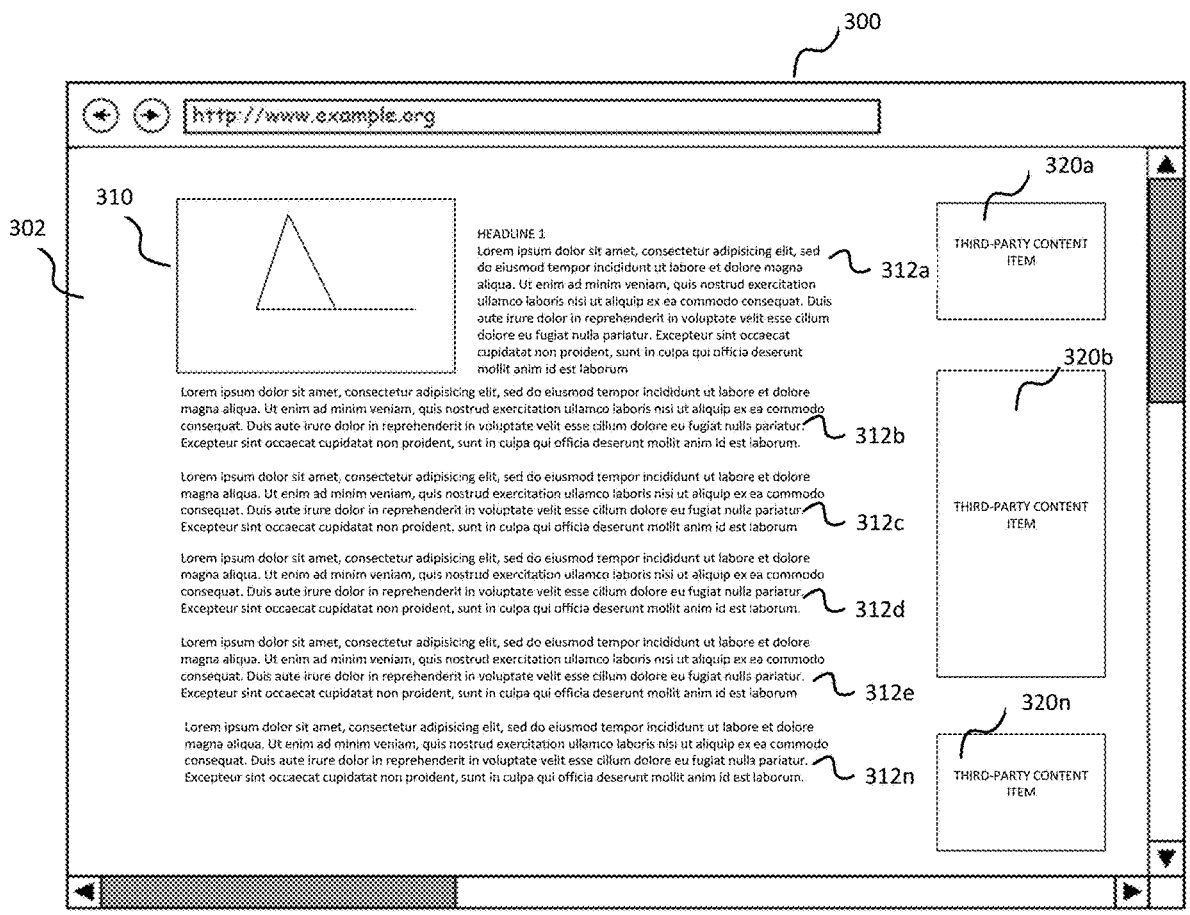
FIG. 3A is a screenshot of a display of an information resource including an article including a plurality of paragraphs.
Figure 3B:
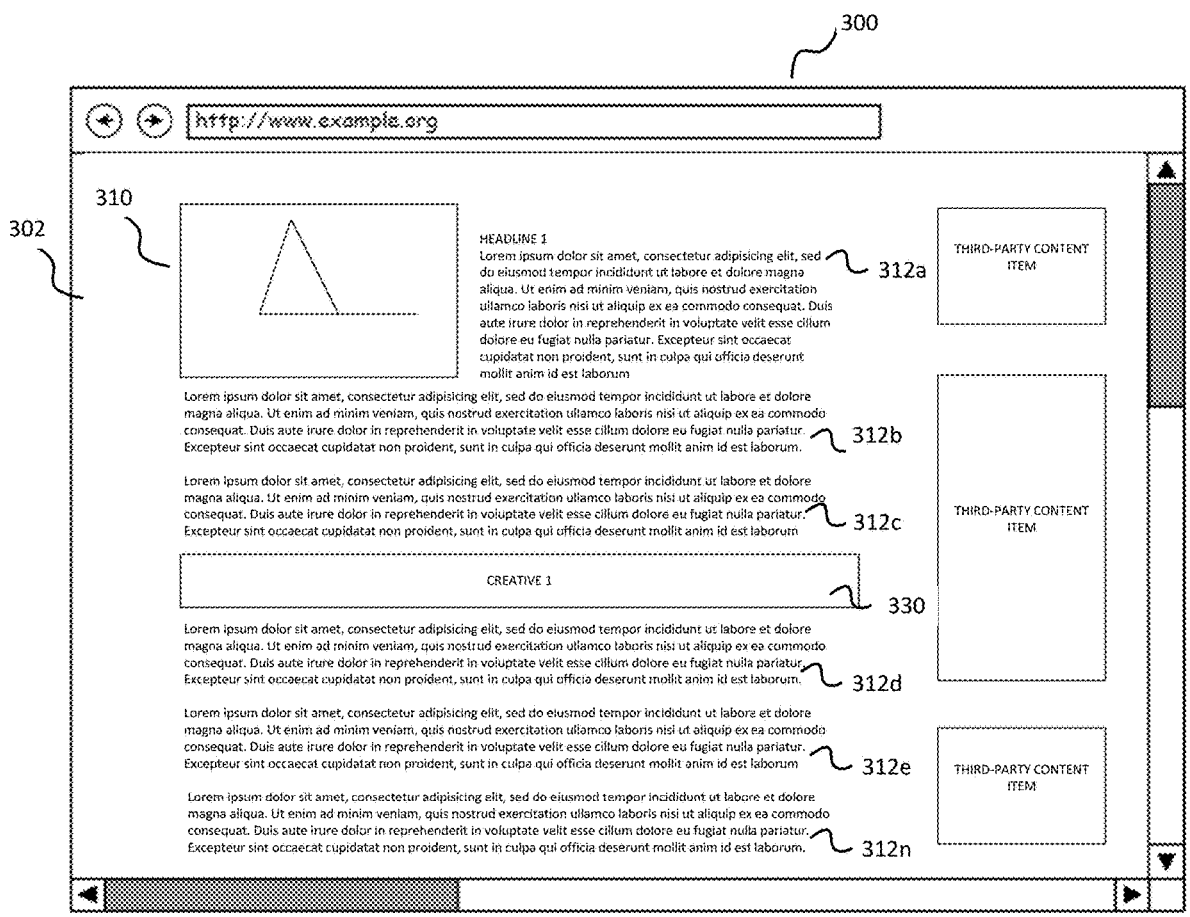
FIG. 3B is a screenshot of a display of the information resource shown in FIG. 3A but including a creative inserted between the plurality of paragraphs.

Referring now briefly to FIGS. 3A and 3B, FIG. 3A shows a screenshot 300 of an information resource 302 displayed within a browser window. The information resource 302 includes primary content and third-party content 320a-n. The primary content comprises an article 310 having an associated image, a headline, and corresponding text in multiple paragraphs 312a-312n. The stable identifier generation module 132 described in FIG. 1 can be configured to associate a stable identifier with the DOM tree of the information resource 302 and identify container nodes containing each of the plurality of paragraphs 312a-n. The content insertion module 134 can be configured to use the stable identifier associated with the information resource 302 to insert creatives in between or adjacent to the plurality of paragraphs 312a-n. FIG. 3B shows a screenshot of the information resource shown in FIG. 3A that includes a creative 330 between two of the paragraphs 312a-n.

In some implementations, the content insertion module 134 can be configured to include a script or other software construct in the DOM tree of the information resource such that when the information resource is rendered on a browser executing on a computing device, the information resource is rendered with creatives inserted in between adjacent paragraphs of an article of the information resource. In some implementations, the browser can execute the script or software construct to identify the container nodes corresponding to the stable identifier, insert creative slots and cause creatives to be retrieved for insertion in the creative slots. In some implementations, the content insertion module 134 can be configured to cause the information resource to render on the browser such that creatives are displayed in slots positioned between adjacent paragraphs or near one or more paragraphs.

The data processing system 110 can also include one or more data stores, such as the database 140. The database can be included in the data processing system 110. In some implementations, the database may be located remote to the data processing system but accessible by the data processing system. The database can store a wide variety of content. For example, the database can store the DOM trees of one or more information resources, lists of container nodes, lists of identifiers associated with the container nodes, maps associating the identifiers with the container nodes, content identification scores of the potential identifiers, as well as the identity of the stable identifier selected to identify the container nodes of the information resource, amongst others. It should be appreciated that the data processing system 110 can include one or more additional modules to provide some or all of the features described herein as well as other additional features.

Figure 4:
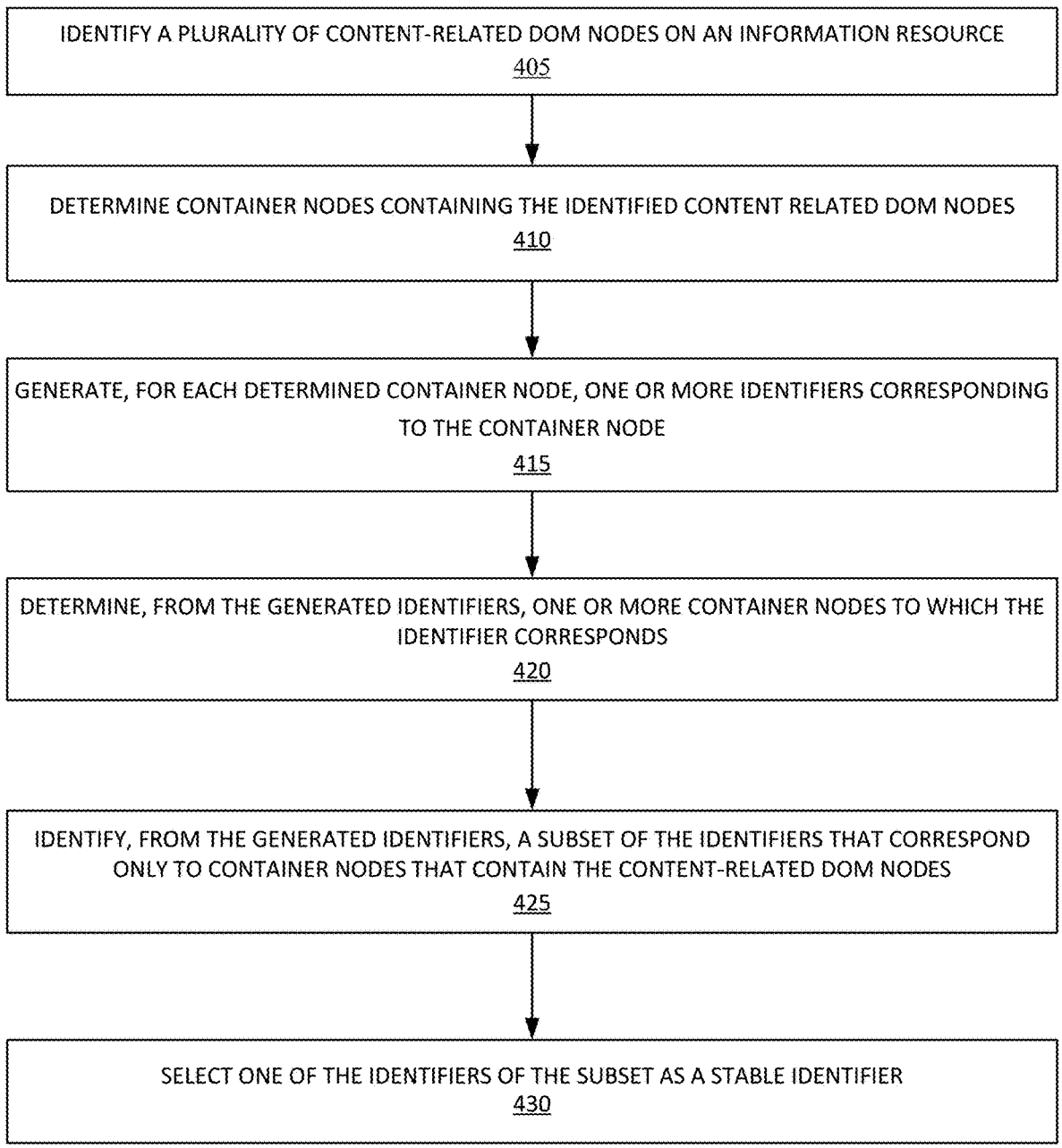
FIG. 4 is a flow diagram depicting one implementation of the steps taken to generate a stable identifier for primary content detected within an information resource.

FIG. 4 is a flow diagram depicting one implementation of the steps taken to generate a stable identifier for nodes likely to include primary content of an information resource. In particular, FIG. 4 illustrates a flow diagram depicting a method 400 for generating a stable identifier for nodes likely to include primary content of an information resource is disclosed. A processor identifies, on an information resource, a plurality of content-related Document Object Model (DOM) nodes likely to include primary content (BLOCK 405). The processor determines one or more container nodes containing one or more of the identified content-related DOM nodes (BLOCK 410). The processor generates, for each of the container nodes, one or more identifiers corresponding to the container node (BLOCK 415). The processor determines, for each of the generated identifiers, one or more container nodes to which the identifier corresponds (BLOCK 420). The processor then determines, from the generated identifiers, a subset of the identifiers that correspond only to container nodes that contain the content-related DOM nodes (BLOCK 425). The processor then selects one of the identifiers of the subset as a stable identifier (BLOCK 430).

In further detail, the processor can identify, on an information resource, a plurality of content-related Document Object Model (DOM) nodes likely to include primary content (BLOCK 405). Examples of primary content can include posts, articles, or other content items that the web publisher has provided. In some implementations, the processor can inspect the DOM tree of an information resource and identify all of the content-related Document Object Model (DOM) nodes included in the information resource. In some implementations, the processor can identify each node included within the information resource and determine whether the identified node is a content-related DOM node. In some implementations, the processor can identify a node by inspecting the DOM tree for tags. A tag associated with a node can indicate the type of node.

In some implementations, the processor can determine that a node is a content-related DOM node based on a primary content detection policy including one or more rules. In some implementations, the processor can determine that a node is a content-related DOM node if the node is one or more of an effective text node, not an effective link node, contains more than a predetermined number of characters, no ancestor of the node is a paragraph, and either the node's rendered height is greater than or equal to twice the height of a line of text of the paragraph or the previous effective text node in the DOM tree is a title.

The processor can determine one or more container nodes containing one or more of the identified content-related DOM nodes (BLOCK 410). In some implementations, the processor can determine, for each content-related DOM node, one or more container nodes containing one or more of the identified content-related DOM nodes. In some implementations, a node of the DOM tree may be identified as a container node if the node meets two criteria. The first criteria is that either the node corresponds to an ARTICLE or the node corresponds to one of a DIV, INS or TD and the node has at least one stable class name. In some implementations, a class name may be considered stable if the class name does not end in a number. In some implementations, a class name is considered to be stable if it does not match the following regular expression: /^.*[09]+$/. The second criteria is that the node either starts with a title or the node is a member of a Cascading Style Sheet (CSS) class that indicates that that the node includes primary content, such as a post. Examples of CSS class types that indicate that the node is a post can include 'post' or 'typepost.'

In some implementations, the processor can determine, for each of the identified content-related DOM nodes, the container node nearest to the content-related DOM node. In some implementations, the container node nearest to a given content-related DOM node can be the container node that contains the content-related DOM node and no other container nodes that also contain the content-related DOM node. In some implementations, the processor can store a record of each identified content-related DOM node and the identity of the nearest container node that contained the identified content-related DOM node.

In some implementations, the processor can determine any equivalent container node for each container node determined to contain one or more of the identified content-related DOM nodes. In some implementations, a node can be considered to be an equivalent container ancestor node if exactly one of the node's descendants is a container node, the DOM node contains exactly the same set of effective text nodes as the descendent container node and the node meets the two criteria for determining that a node is a container node.

In some implementations, the processor can maintain a list of container nodes. The primary content detection module can include each of the container nodes determined for each of the content-related DOM nodes in the list. In some implementations, the processor can also include each of the equivalent container ancestor nodes determined for each container node. In some implementations, the processor can remove any duplicate nodes from the list such that the list of container nodes includes each of the determined container nodes and any equivalent container ancestor nodes corresponding to the determined container nodes.

The processor can generate, for each of the container nodes, one or more identifiers corresponding to the container node (BLOCK 415). In some implementations, the processor can generate, for each of the container nodes included in the list of container nodes, one or more identifiers corresponding to the container node. In some implementations, the stable identifier generation module can be configured to generate, for each of the container nodes included in the list, every identifier corresponding to the container node.

In some implementations, the processor can generate an identifier based on the tag associated with the container node for which the processor is generating the identifier. In some implementations, the processor can generate an identifier based on the class name associated with the container node. In some implementations, the processor can generate the identifier according to an identifier generation policy that includes one or more rules. In some implementations, to generate an identifier for a given container node according to the identifier generation policy, the processor identifies the type of tag associated with the container node and a class name associated with the tag. In some implementations, the processor can generate an identifier having only a tag name if the container node corresponds to an ARTICLE tag type. In some implementations, the tag name of the identifier can be ARTICLE. In some implementations, the processor can generate an identifier having a tag name and an ID if the ID is stable. A stable ID can be any ID that does not end in a number In some implementations, the processor can generate an identifier having a tag name and a class name if the container node corresponds to any tag type other than ARTICLE. In some implementations, the identifier can include the tag type and a single stable class name. In some implementations, the stable class name can correspond to a class name that does not end with a number.

In some implementations, the processor can maintain a list of identifiers generated for the container nodes included in the list of container nodes. In some implementations, the processor may remove any duplicates in the list of identifiers generated for the container nodes. In some implementations, the processor can sort the identifiers generated for the container nodes based on a preference policy. In some implementations, the preference policy can include one or more rules for sorting the potential identifiers.

In some implementations, the processor can arrange a plurality of the generated identifiers of the list of identifiers in order of highest preference to lowest preference. The processor can compare two or more identifiers at a time and determine which of the identifiers has a higher preference. In some implementations, the processor can first determine whether any of the two identifiers includes only a tag name. Identifiers with only a tag name are preferred over identifiers having a tag name and an ID or identifiers having a tag name and a class name. As such, if one of the identifiers has only a tag name, that identifier will be ranked higher than the identifier not having only a tag name. If the processor determines that none of the identifiers being compared includes only a tag name, the processor can determine whether any of the two identifiers includes a tag name and an ID. Identifiers having a tag name and an ID are preferred over identifiers having a tag name without an ID. As such, if one of the identifiers has a tag name and an ID, that identifier will be ranked higher than the identifier not having an ID. If the processor determines that none of the identifiers includes a tag name and an ID, the processor determines whether any of the two identifiers includes a tag name and a class name. Identifiers having a tag name and a class name are preferred over identifiers having a tag name without a class name. As such, if one of the identifiers has a tag name and a class name, the processor will rank that identifier higher than the identifier not having a class name. If the processor identifies that both of the identifiers includes a tag name and a class name, the processor can determine which of the identifiers has a more preferred class name. Identifiers having a more preferred class name are preferred over identifiers having a less preferred class name. As such, if one of the identifiers has a tag name and a more preferred class name, the processor will rank that identifier higher than the identifier not having the more preferred class name. In some implementations, the class name 'post-container' is more preferred than the class names 'post' and 'type-post' and the class name 'post' is more preferred than the class name 'type-post.' If the processor identifies that none of the identifiers includes a tag name with a preferred class name, the processor can determine that the identifier with the longer class name is preferred over an identifier with a shorter class name. As such, the identifier having a longer class name will be ranked higher than the identifier having a shorter class name.

The processor determines, for each of the generated identifiers, one or more container nodes to which the identifier corresponds (BLOCK 420). In some implementations, the processor can associate each of the identifiers generated by the processor to the container nodes to determine a subset of identifiers that correspond only to container nodes that contain the content-related DOM nodes. In some implementations, the processor can map each generated identifier to all of the container nodes from which the processor could have possibly generated the identifier. This is because multiple container nodes may have the same tag types or ids or class names, which result in container nodes having the same tag types or ids or class names generating identical identifiers. In some implementations, the identifiers can serve as keys in a map constructed to map the identifiers to each of the container nodes. In some implementations, the processor can perform, for each identifier, a lookup in the DOM tree of the information resource to identify all nodes that can be referenced by the identifier.

The processor can determine, from the generated identifiers, a subset of the identifiers that correspond only to container nodes that contain the content-related DOM nodes (BLOCK 425). In some implementations, the processor can perform, for each identifier, a lookup in the DOM tree of the information resource to identify all nodes that can be referenced by the identifier. In some implementations, nodes that can be referenced by the identifier include nodes that have characteristics (for example, tag type, id, class name) that would cause the processor to generate the identifier based on the characteristics of the node. For each of the identified nodes corresponding to the identifier, the processor can determine that the identified node is either in a list of container nodes maintained by the processor or that the node meets the criteria for being identified as a container node. In response to determining that the identified node is not on the list of container nodes or does not meet the criteria for being identified as a container node, the processor can disregard the identifier as a stable identifier and remove the identifier from the list of identifiers. Conversely, in response to determining that the identified node is either on the list of container nodes or meets the criteria for being identified as a container node, the processor can include the identifier as a potential stable identifier and as such, determine a content identification score for the identifier. The content identification score can indicate how well the identifier identifies posts, articles or other primary content on the information resource.

The processor can select one of the identifiers of the subset as a stable identifier (BLOCK 430). In some implementations, the processor can determine a content identification score for each of the potential identifiers. In some implementations, the processor can determine the content identification score based on a number of contents of the container nodes to which the identifier is associated. In some implementations, the processor can determine the content identification score of each identifier based on a first number of characters in nodes likely to include primary content(for example, paragraph nodes) that are contained the container nodes associated with the identifier and a second number of characters included within the container nodes associated with the identifier. In some implementations, the processor can determine the content identification score of each identifier based on a first number of nodes likely to include primary content that are contained in the container nodes associated with the identifier and a second number of paragraphs included within the information resource. In some implementations, the processor can determine the content identification score of each identifier based on a first number of characters in nodes likely to include primary content that are contained in the container nodes associated with the identifier and a second number of characters included within all nodes likely to include primary content that are included within the information resource.

The processor can identify the identifier having the largest content identification score. The processor can then select the identifier having the highest content identification score as the stable identifier for identifying container nodes that contain nodes that are likely to include primary content. In some implementations, the processor can store the identity of the stable identifier with the information resource. In this way, the processor can identify posts or articles or nodes likely to include primary content using the stable identifier, which can identify the container nodes corresponding to the posts or articles or nodes likely to include primary content. In some implementations, the processor inserts a creative in between adjacent container nodes corresponding to the stable identifier responsive to receiving a request to serve the information resource.

The following is an implementation of a portion of a DOM tree of an information resource. As shown below, some of the nodes are followed by annotations indicating the type of node. For ease of reference, the annotations begin with //.

```
<div id='postOne' class='content-entry'> //Ancestor Container Node
    <div class='left-align'> // Container Node
        <h2>Post 1 Title</h2>
        <p>Paragraph 1 . . . blaa blaa blaa . . . end.</p> //DOM node likely to contain primary content
<p>Paragraph 2 . . . blaa blaa blaa . . . end.</p> // DOM node likely to contain primary content
    </div>
</div>
<div id='postTwo' class='content-entry'> // Ancestor Container Node
    <div class='left-align'> // Container Node
        <h2>Post 2 Title</h2>
        <p>Paragraph 1 . . . blaa blaa blaa . . . end.</p> // DOM node likely to contain primary content
        <p>Paragraph 2 . . . blaa blaa blaa . . . end.</p> // DOM node likely to contain primary content
    </div>
</div>
<div id='link-box' class='left-align'> //Other HTML node on information resource
(Not a post)
    <a href='#'>Link 1</a>
    <a href='#'>Link 2</a>
</div>
```

Using the DOM tree above, the processor can generate the following identifiers based on the container nodes. The processor can generate the following identifier for the container nodes.

```
{
    tagName: 'DIV',
    className: 'left-align'
}
```

By considering ancestor container nodes, the processor can expand the list of identifiers to the following four identifiers:

```
{
    tagName: 'DIV',
    className: 'left-align'
}
{
    tagName: 'DIV',
    id: 'postOne'
}
{
    tagName: 'DIV',
    id: 'postTwo'
}
{
    tagName: 'DIV',
    className: 'content-entry'
}
```

The processor would then discard the tagName: 'DIV', className: 'left-align' identifier since it is a container node that does not contain a node likely to contain primary content. In particular, the {tagName: 'DIV', className: 'left-align'} identifier references the following container:

```
<div id='link-box' class='left-align'>
    <a href='#'>Link 1</a>
    <a href='#'>Link 2</a>
</div>.
```

The processor would then arrange the remaining three identifiers according to a preference order and select the {tagName: 'DIV', className: 'content-entry'} identifier as the stable identifier as this identifier would have the highest score.

B. Detecting Styles of Properties of DOM Elements of an Information Resource

Native ads refer to a class of online ads that match the look and feel of primary content on a content publisher's website. At present, a few content publishers manually generate native ads for their websites. However, doing so is a tedious process that requires both time and technical expertise. Moreover, it is impossible for content publishers that serve ads selected via real-time auctions to manually modify ads to match the styles of properties of other content on the website. Aspects of the present disclosure relate to methods and systems for automatically detecting styles of properties of DOM elements of a website and modifying ads selected for insertion to match the styles of properties of the DOM elements of the website such that the modified ads appear as native ads.

Referring again to FIG. 1, as described above with respect to Section A, the primary content detection module 130, the stable identifier generation module 132, the content insertion module 134, the style property detection module 136 and the third-party content modification module 138 can include or execute at least one computer program or at least one script. The primary content detection module 130, the stable identifier generation module 132, the content insertion module 134, the style property detection module 136 and the third-party content modification module 138 can be separate components, a single component, or part of the data processing system 110. The primary content detection module 130, the stable identifier generation module 132, the content insertion module 134, the style property detection module 136 and the third-party content modification module 138 can include combinations of software and hardware, such as one or more processors configured to execute one or more scripts to identify an information resource for which to automatically detect styles of properties used to style primary content of the information resource, identify at least one DOM container that contains at least a portion of the primary content, determine, for each of one or more DOM elements included in the DOM container, styles of properties corresponding to a respective DOM element, store, in a memory, the determined styles of properties corresponding to the respective DOM elements included in the DOM container and use the stored styles of properties to modify third-party content to be inserted within the information resource, for instance.

The style property detection module 136 can be designed, constructed or configured to identify an information resource for which to detect styles of properties of DOM elements included in the information resource. In some implementations, the style property detection module 136 can identify the information resource responsive to receiving a request from a content publisher requesting to serve native third-party content items on an information resource of the content publisher. In some implementations, the style property detection module 136 can identify a plurality of information resources on which a third-party content item has previously been served. In some implementations, the style property detection module 136 can identify the plurality of information resources from an advertising auction log that includes a list of webpages on which a third-party content item was previously served. In some implementations, the log can be maintained by an advertising management entity that stores a record of each third-party content item served on a webpage. In some implementations, the advertising management entity can be a part of the data processing system 110.

In some implementations, the style property detection module 136 can identify a plurality of URLs corresponding to information resources on which ads were previously served. The style property detection module 136 may group URLs corresponding to a single information resource together using an identifier unique to the information resource.

In some implementations, the style property detection module 136 can be configured to render the information resource for which to detect styles of properties of DOM elements on a browser, such as a headless browser. In some implementations, the style property detection module 136 can determine, using the techniques described above with respect to Section A, one or more DOM nodes that correspond to primary content. In some implementations, the style property detection module 136 can identify DOM nodes that correspond to primary content, such as a post, article or any other DOM structure that includes primary content. In some implementations, the primary content detection module 130 or other module of the data processing system 110 can identify DOM nodes or elements that correspond to a post, article or any other DOM structure that includes primary content. In some implementations, the primary content detection module 130 can determine one or more container nodes that contain the DOM nodes that correspond to primary content.

The style property detection module 136 can then determine, for the container nodes that contain the DOM nodes corresponding to primary content, a plurality of DOM elements included in the container node. Each of the DOM elements can include one or more properties that have associated styles that define the look and feel of the content included in the DOM elements. In some implementations, the styles of properties of a DOM element can be defined within the DOM element. In some implementations, the styles of properties of a DOM element can be defined by a style property sheet, such as a cascading style sheet (CSS) of the information resource. In some implementations, the content publisher can define the styles of properties of each of the DOM elements included in the information resource.

In some implementations, the style property detection module 136 can identify or determine styles of properties associated with certain types of DOM elements. In particular, the style property detection module 136 can determine styles of properties of DOM elements that can be used to generate native third-party content items to serve on the information resource. In some implementations, third-party content items may be served along with primary content of an information resource. However, when selecting a third-party content item to serve, the third-party content item may be in a format or have styles of properties that do not match the look and feel, or in other words, the styles of properties of the primary content included in the information resource. As such, a text ad selected to be served on the information resource may be modified to match the look and feel of the primary content of the information resource prior to being served.

In some implementations, the text ad selected to be served may be generated by an advertising entity that manages ad selection. As such, many text ads may have a style that is generic to all text ads generated by the advertising entity. In some implementations, the text ad may include a title, which may also be a clickable link to a landing page, one or more lines of text, and a website address. In some such implementations, the title element of the text ad can have a first set of styles of properties, the one or more lines of text may have a second set of styles of properties and the website address may have a third set of styles of properties.

In some implementations, the data processing system 110 may generate a native content item based on the selected text ad that matches the styles of properties of certain DOM elements of the primary content of the information resource. In some implementations, to do so, the style property detection module 136 may identify one or more DOM elements of the primary content whose styles of properties may be used to generate the modified third-party content item. For example, the title element of the text ad, which can include a link, can be modified with styles of properties corresponding to a link of a title of a post or article included in the information resource on which the modified third-party content item is to be served. In some implementations, the style property detection module 136 can determine, from a DOM element corresponding to a header element of the primary content, whether the header element includes a link. The header element can correspond to a title of a post or an article. The style property detection module 136 can insert, responsive to determining that the DOM element corresponding to the header element does not include a link, a link in the header element. The style property detection module 136 can then determine styles of properties associated with the header element in which the link is inserted, which can then be stored in the memory.

Similarly, the text elements of the text ad can be modified with styles of properties corresponding to text portions of the post or article of the information resource. Moreover, the website address element of the text address can be modified with styles of properties corresponding to a link included within the text portion of the post or article of the information resource. If the DOM element corresponding to the text portion of the post does not include a link, the style property detection module 136 can insert, responsive to determining that the DOM element corresponding to the text portion does not include a link, a link in the text portion. The style property detection module 136 can then determine styles of properties associated with the text portion in which the link is inserted and store the styles of properties in the memory. In this way, when the modified third-party content item is served on the information resource, the modified third-party content item appears to be a native ad as opposed to a text ad generated by an entity different from the content publisher. Details regarding generating a native ad from a text ad received from a third-party content provider or other entity are provided below.

In some implementations, the style property detection module 136 can determine the styles of one or more properties of a particular DOM element using a function call. In some implementations, the function call can employ a script to determine styles of properties or characteristics of DOM elements. One particular function is window.getComputedStyle, which can determine the effective styles on DOM elements after CSS and styling rules have been considered. In some implementations, the window.getComputedStyle( ) function can return the values of all the CSS properties of an element after applying the active stylesheets and resolving any basic computation those values may contain. The style property detection module 136 can determine, for each of the DOM elements that may be used to generate native ads, styles of properties of the DOM element. In some implementations, the style property detection module 136 can determine the styles of properties of such DOM elements by applying the window.getComputedStyle( ) function to such DOM elements.

In some implementations, the style property detection module 136 can determine the styles of different properties corresponding to different DOM nodes or elements. For instance, the style property detection module 136 can determine styles of properties of a node container including primary content of an information resource. The properties for which styles can be determined include but are not limited to, "background-color," "border," "border-bottom," "border-top," "margin," "padding" and "float," among others. The style property detection module 136 can also determine styles corresponding to a title element within the post. In some implementations, the title element can include a link. For the title element, the style property detection module 136 can determine styles of properties, including but not limited to, "font-family," "font-size," "font-weight," "color," "text-align," "text-decoration," "line-height" and hover effects, if the title element includes a link, among others.

In some implementations, the style property detection module 136 can also determine styles of properties of a DOM element corresponding to a paragraph, text or body portion within the post. In some implementations, the DOM element corresponding to the paragraph, text or body portion within the post can include a link. The properties for which the style property detection module 136 can determine styles include but are not limited to, "font-family," "font-size," "font-weight," "color," "text-align," "text-decoration," "line-height" and hover effects if the text portion includes a link.

In some implementations, the style property detection module 136 can also determine styles of properties of a DOM element corresponding to an image included within a post or article or other primary content of the information resource. For example, a post may include a title, a body and a corresponding image. In some implementations, the style property detection module 136 can determine styles of properties of the image. In some implementations, examples of properties for which the style property detection module 136 can determine styles include but are not limited to "width," "height," "display," "margin," "padding," "border," "float," and effects, such as circle, crop, black and white, among others.

In some implementations, the primary content included in an information resource may be surrounded by borders or other visual artifacts or features. For example, a web page that includes a series of posts or articles may each include borders that can improve the user experience. In some implementations, the DOM elements corresponding to the post, article, or other primary content may not include properties that define the borders around the post or article. Rather, another DOM element that may contain the DOM elements corresponding to the post or article may define the borders. As such, the style property detection module 136 may be configured to determine styles of properties of such DOM elements that do not necessarily correspond to primary content but may have an effect on the presentation of the primary content.

In some implementations, a portion of a DOM tree of an information resource that includes a post or article may have the following structure:

```
<div class='post' style='margintop: 10px;'>
    <div style='bordertop: 1px solid black;'>
        <h1>The Post Title</h1>
        <p>The post text.</p>
    </div>
</div>
```

Accordingly, in some implementations, determining styles of properties of a border of the post may not be determined by determining the styles of properties of the DOM element corresponding to the post container (class='post') since the property 'bordertop' is defined in a DOM element that is a descendent of the DOM element corresponding to the post container.

In some implementations, the style property detection module 136 can determine the styles of properties related to a border of the primary content. In some implementations, the style property detection module 136 can determine one or more border properties for which to determine styles. In some implementations, examples of border properties can include "border," "borderbottom," "bordertop," "margin," "padding" and "float," among others. In some implementations, the style property detection module 136 can determine whether the DOM element corresponding to the container node defines styles of the one or more border properties. If the DOM element corresponding to the container node does not defines styles of any of the one or more border properties, the style property detection module 136 can determine whether a child or descendent of the DOM element corresponding to the container node defines the styles of the border properties not defined by the DOM element corresponding to the container node. In this way, the style property detection module 136 can determine the styles of border properties even though the container node corresponding to the primary content does not define the styles of the border properties. In some implementations, the following algorithm can be used to determine a border property, for instance, the effective top border, of an element:

```
function getEffectiveTopBorder(element) {
    var border = element.getComputedStyleValue('bordertop');
    if (border != null && !border.contains('0px') &&
    !border.contains('none')) {
        return border;
    }
    if (element.childNodes.length > 0) {
        return getEffectiveTopBorder(element.childNodes[0]);
    }
    return null;
}
```

In some implementations, the style property detection module 136 can similarly determine other border properties. In some implementations, if the style property detection module 136 desires to determine the style of a bottom border property, the style property detection module 136 may work backwards through the descendants of the container node starting with the last child of the post container, as it may be likely that the bottom border may be defined by a DOM element towards the end of the container node.

In some implementations, the style property detection module 136 can store, in a memory, the determined styles of properties corresponding to the respective DOM elements included in the DOM container. In some implementations, the style property detection module 136 can store the styles of properties of the DOM elements corresponding to primary content in a data structure. In some implementations, the style property detection module 136 can associate the styles of properties of the DOM elements corresponding to primary content with an identifier identifying the information resource that includes the primary content. In some implementations, multiple information resources can be associated with the determined styles of properties responsive to determining that the styles of properties of the DOM elements of the primary content in each of the multiple information resources match one another. In some implementations, multiple web pages of the same web site may be grouped together if they contain primary content that is presented in a similar manner.

In some implementations, the style property detection module 136 can generate an identifier corresponding to the styles of properties of the various DOM elements of the primary content of an information resource. This identifier can include tagNames and ClassNames that may be used to modify content that is to be inserted in the information resource at a later time. In this way, native ads can be served on a content publisher's web page without requiring the content publisher to manually update the styles of properties of DOM elements corresponding to the native ad.

In some implementations, the content insertion module 134 can identify locations in the DOM tree in which to insert DOM elements corresponding to native ads. In some implementations, the content insertion module 134 can insert the DOM elements corresponding to native ads adjacent to DOM elements corresponding to posts or articles, such that the native ads have the same look and feel as posts or articles that form the primary content of the information resource. In some implementations, the content insertion module 134 can generate markers identifying locations in which to insert native ads. The style property detection module 136 can then store these markers along with the determined styles of properties determined by the style property detection module 136. In some implementations, the content insertion module 134 can generate a DOM node corresponding to a native content item that can be updated and inserted into an appropriate location within the DOM tree of the information resource such that when the information resource is rendered, the content item is displayed as a native content item along with primary content of the information resource. In some implementations, the style property detection module 136 can store these generated DOM nodes that include properties having styles that match the styles of properties of certain DOM elements of the primary content determined by the style property detection module 136. In some implementations, when a third-party content item to be inserted in the information resource is received, one or more modules of the data processing system 110 can retrieve the generated DOM node, extract information from the third-party content item and insert the extracted information in the generated DOM node. The data processing system 110 can then insert the generated DOM node including the extracted information in the DOM tree of the information resource such that when the information resource is rendered for display, the third-party content item is rendered for display as a native ad that matches the look and feel of primary content of the information resource.

In some implementations, the style property detection module 136 can create or generate a CSS styling profile for the information resource that includes the DOM elements corresponding to the primary content and styles of properties associated with the DOM elements. The style property detection module 136 can store the generated CSS styling profile in the memory such that when a request to convert a third-party content item to a native ad or native content item, the conversion can occur without requiring any input from the content publisher of the information resource.

The third-party content modification module 138 can be designed, constructed or configured to modify third-party content items into native content items that match the look and feel of an information resource for which the style property detection module 136 has determined the styles of properties of DOM elements corresponding to primary content. The third-party content modification module 138 can be configured to identify a third-party content item to serve on the information resource. In some implementations, the third-party content modification module 138 can identify the third-party content item by receiving the third-party content item from an advertising auction system. In some implementations, the third-party content modification module 138 can identify the third-party content item responsive to receiving a request to include the third-party content item on the information resource. For instance, the request can be a request to include an article or post previously displayed on another information resource on the information resource.

To maintain the look and feel of the information resource, the article or post may be modified into a native content item before being included in the information resource.

The third-party content modification module 138 can identify the information resource on which to include the identified third-party content item. The third-party content modification module 138 can use an identifier of the information resource to perform a lookup in the memory to retrieve the styles of properties of DOM elements of the primary content of the information resource previously determined by the style property detection module 136.

In some implementations, the third-party content modification module 138 can retrieve the CSS styling profile of the information resource or some other information that the third-party content modification module 138 can use to modify the identified third-party content item into a native content item for the information resource on which to serve the third-party content item. In some implementations, the third-party content modification module 138 can identify the DOM elements of the primary content that may be used to modify the corresponding elements of the third-party content item. In some implementations, the CSS styling profile can identify the DOM elements of the primary content to use for modifying third-party content item. In some implementations, the CSS styling profile can include a DOM element corresponding to a link within a header of an article or post, a DOM element corresponding to text within a body portion of the article or post, and a DOM element corresponding to a link within the body portion of the article or post.

In some implementations, the third-party content modification module 138 can be configured to modify a text ad to a native ad. In some implementations, the third-party content modification module 138 can identify the header of the text ad and extract the text and link of the header of the text ad to generate a DOM element corresponding to a header portion of the native ad. In this way, when the native ad is rendered on the information resource, the header of the native ad includes the text of the header of the text ad and a link of the header of the native ad is directed to the same landing page as the link of the header of the text ad. Similarly, the third-party content modification module 138 can identify the text portion of the text ad and extract the text portion to insert in a corresponding text portion of the native ad. The DOM element of the text portion of the native ad, however, will have the styles of properties of the DOM element of the text portion of the primary content of the information resource. Moreover, the third-party content modification module 138 can identify the web site address portion of the text ad and extract the web site address to insert in text portion of the native ad. The DOM element of the portion of the native ad containing the website address, however, will have the styles of properties of the DOM element of a link that may appear in the text portion of the primary content of the information resource.

Once the third-party content modification module 138 generates the native content item from the identified third-party content item, the third-party content modification module 138 can pass the generated native content item to the content insertion module 134, which can then handle the insertion of the content item prior to rendering the information resource to an end user computing device. In some implementations, the content insertion module 134 may be configured to modify the DOM tree of the information resource to include a DOM node including a plurality of DOM elements that form the native content item. As described herein, the content insertion module 134 can determine a location in the DOM tree to insert the DOM node corresponding to the native content item. In some implementations, the DOM node can be inserted in the DOM tree such that the native content item is rendered below the first post or article is rendered on the information resource.

In some implementations, the content insertion module can be configured to inject a DOM node or element corresponding to the native content item onto the information resource. In some implementations, the native content item can be served using a DOM element styling function. For instance, the format of the native content item that may be inserted in the DOM tree of the information resource may look like the following:

```
<DIV>
    <IFRAME src="{ad style frame url}">
        <DIV class="ad">
            <DIV class="title">
                <A href="{{ url }}">{{ title }}</A>
            </DIV>
            <DIV class="url">
                <A href="{{ url }}">{{ visible_url }}</A>
            </DIV>
            <DIV class="text">{{ text }}
            </DIV>
        </DIV>
    </IFRAME>
</DIV>
```

FIG. 5 is a flow diagram depicting one implementation of the steps taken to detect styles of properties Of DOM Elements Of An Information Resource. One or more processors can identify an information resource for which to automatically detect styles of properties used to style primary content of the information resource (BLOCK 505). The processors can identify at least one DOM container that contains at least a portion of the primary content (BLOCK 510). The processors can determine, for each of one or more DOM elements included in the DOM container, styles of properties corresponding to a respective DOM element (BLOCK 515). The processors can store, in a memory, the determined styles of properties corresponding to the respective DOM elements included in the DOM container (BLOCK 520). The processors can use the stored styles of properties to modify third-party content to be inserted within the information resource (BLOCK 525).

The processors can identify an information resource for which to automatically detect styles of properties used to style primary content of the information resource (BLOCK 505). In some implementations, the processors can identify the information resource responsive to receiving a request from a content publisher requesting to serve native third-party content items on an information resource of the content publisher. In some implementations, the processors can identify a plurality of information resources on which a third-party content item has previously been served. In some implementations, the processors can identify the plurality of information resources from an advertising auction log that includes a list of webpages on which a third-party content item was previously served. In some implementations, the log can be maintained by an advertising management entity that stores a record of each third-party content item served on a webpage. In some implementations, the advertising management entity can be a part of the data processing system. In some implementations, the processors can identify a plurality of URLs corresponding to information resources on which ads were previously served. The processors may group URLs corresponding to a single information resource together using an identifier unique to the information resource.

The processors can identify at least one DOM container that contains at least a portion of the primary content (BLOCK 510). The processors can identify at least one DOM container that contains at least a portion of the primary content by inspecting a DOM tree of the information resource. In some implementations, the processors can render the information resource for which to detect styles of properties of DOM elements on a browser, such as a headless browser. In some implementations, the processors can determine, using the techniques described above with respect to Section A, one or more DOM nodes that correspond to primary content. In some implementations, the processors can identify DOM nodes that correspond to primary content, such as a post, article or any other DOM structure that includes primary content. In some implementations, the processors can determine one or more container nodes that contain the DOM nodes that correspond to primary content. In some implementations, the processors can identify one or more DOM elements included in the DOM container. The processors can then determine, for each of the one or more identified DOM elements, the type of DOM element. The processors can then determine, based on the type of DOM element, styles of properties of the DOM element that may be relevant for generating native content items for the information resource.

The processors can determine, for each of one or more DOM elements included in the DOM container, styles of properties corresponding to a respective DOM element (BLOCK 515). The processors can determine, for the container nodes that contain the DOM nodes corresponding to primary content, a plurality of DOM elements included in the container node. Each of the DOM elements can include one or more properties that have associated styles that define the look and feel of the content included in the DOM elements. In some implementations, the styles of properties of a DOM element can be defined within the DOM element. In some implementations, the styles of properties of a DOM element can be defined by a style property sheet, such as a cascading style sheet (CSS) of the information resource. In some implementations, the content publisher can define the styles of properties of each of the DOM elements included in the information resource.

In some implementations, the processors can identify, determine or detect styles of properties associated with certain types of DOM elements. In particular, the processors can determine styles of properties of DOM elements that can be used to generate native content items from third-party items for serving on the information resource. In some implementations, third-party content items may be served along with the primary content. However, when selecting a third-party content item to serve, the third-party content item may be in a format or have styles of properties that do not match the look and feel, or in other words, the styles of properties of the primary content included in the information resource. As such, a text ad selected to be served on the information resource may be modified to match the look and feel of the primary content of the information resource prior to being served.

In some implementations, processors may identify one or more DOM elements of the primary content whose styles of properties may be used to generate a native content item from a third-party content item selected to be served on the information resource. For example, the title or header element of a text ad, which can include a link, can be modified with styles of properties corresponding to a link of a title of a post or article included in the information resource on which the modified third-party content item is to be served. Similarly, the text elements of the text ad can be modified with styles of properties corresponding to text portions of the post or article of the information resource. Moreover, the website address element of the text address can be modified with styles of properties corresponding to a link included within the text portion of the post or article of the information resource. In this way, when the modified third-party content item is served on the information resource, the modified third-party content item appears to be a native ad as opposed to a text ad generated by an entity different from the content publisher. Details regarding generating a native ad from a text ad received from a third-party content provider or other entity are provided below.

In some implementations, the processors can determine the styles of one or more properties of a particular DOM element using a function call. In some implementations, the function call can employ a script to determine styles of properties or characteristics of DOM elements. One particular function is window.getComputedStyle, which can determine the effective styles on DOM elements after CSS and styling rules have been considered. In some implementations, the window.getComputedStyle( ) function can return the values of all the CSS properties of an element after applying the active stylesheets and resolving any basic computation those values may contain. The processors can determine, for each of the DOM elements that may be used to generate native ads, styles of properties of the DOM element. In some implementations, the processors can determine the styles of properties of such DOM elements by applying the window.getComputedStyle( ) function to such DOM elements.

In some implementations, the processors can determine the styles of different properties corresponding to different DOM nodes or elements. For instance, the processors can determine styles of properties of a node container including primary content of an information resource. The processors can also determine styles corresponding to a title or header element within the post. In some implementations, the title or header element can include a link. In some implementations, the title or header element of the primary content may not include a link. However, the processors may desire to include a link to a landing page for a native content item to be inserted in the information resource. In some implementations, the processors can determine, from a DOM element corresponding to a header element of the primary content, whether the header element includes a link. The header element can correspond to a title of a post or an article. The processors can insert, responsive to determining that the DOM element corresponding to the header element does not include a link, a link in the header element. The processors can then determine styles of properties associated with the header element in which the link is inserted, which can then be stored in the memory.

In some implementations, the processors can also determine styles of properties of a DOM element corresponding to a paragraph, text or body portion within the post. In some implementations, the DOM element corresponding to the text or body portion within the post can include a link. In some implementations, the processors can also determine styles of properties of a DOM element corresponding to an image included within a post or article or other primary content of the information resource.

In some implementations, the primary content included in an information resource may be surrounded by borders or other visual artifacts or features. In some implementations, the DOM elements corresponding to the post, article, or other primary content may not include properties that define the borders around the post or article. Rather, another DOM element that may contain the DOM elements corresponding to the post or article may define the borders. As such, the processors may determine styles of properties of such DOM elements that do not necessarily correspond to primary content but may have an effect on the presentation of the primary content.

Accordingly, in some implementations, determining styles of properties of a border of the post may not be determined by determining the styles of properties of the DOM element corresponding to the post container. In some implementations, the processors can determine the styles of properties related to a border of the primary content. In some implementations, the processors can determine whether the DOM element corresponding to the container node defines styles of the one or more border properties. If the DOM element corresponding to the container node does not defines styles of any of the one or more border properties, the processors can determine whether a child or descendent of the DOM element corresponding to the container node defines the styles of the border properties not defined by the DOM element corresponding to the container node. In this way, the processors can determine the styles of border properties even though the container node corresponding to the primary content does not define the styles of the border properties. In some implementations, the processors can similarly determine other border properties. In some implementations, if the processors desire to determine the style of a bottom border property, the processors may work backwards through the descendants of the container node starting with the last child of the post container, as it may be likely that the bottom border may be defined by a DOM element towards the end of the container node.

In some implementations, the processors can determine, from a DOM element corresponding to the DOM container, that the DOM element does not include a style property of a border. The processors can then identify, from a descendant of the DOM element, that the descendant of the DOM element contains the style property of the border. In some implementations, the DOM element can be a DOM container node that contains one of a post or an article corresponding to primary content of the information resource. The processors can then set the styles of the properties corresponding to the border of the descendant of the DOM element as the styles of properties of the border for the DOM element corresponding to the DOM container.

The processors can store, in a memory, the determined styles of properties corresponding to the respective DOM elements included in the DOM container (BLOCK 520). In some implementations, the processors can store the styles of properties of the DOM elements corresponding to primary content in a data structure. In some implementations, the processors can associate the styles of properties of the DOM elements corresponding to primary content with an identifier identifying the information resource that includes the primary content. In some implementations, multiple information resources can be associated with the determined styles of properties responsive to determining that the styles of properties of the DOM elements of the primary content in each of the multiple information resources match one another. In some implementations, multiple web pages of the same web site may be grouped together if they contain primary content that is presented in a similar manner.

In some implementations, the processors can generate an identifier corresponding to the styles of properties of the various DOM elements of the primary content of an information resource. This identifier can include tagNames and ClassNames that may be used to modify content that is to be inserted in the information resource at a later time.

In some implementations, the processors can identify locations in the DOM tree in which to insert DOM elements corresponding to native ads. In some implementations, the processors can insert the DOM elements corresponding to native ads adjacent to DOM elements corresponding to posts or articles, such that the native ads have the same look and feel as posts or articles that form the primary content of the information resource. In some implementations, the processors can generate markers identifying locations in which to insert native ads. The processors can then store these markers along with the styles of properties determined by the processors. In some implementations, the processors can generate a DOM node corresponding to a native content item that can be updated and inserted into an appropriate location within the DOM tree of the information resource such that when the information resource is rendered, the content item is displayed as a native content item along with primary content of the information resource. In some implementations, the processors can store these generated DOM nodes that include properties having styles that match the styles of properties of certain DOM elements of the primary content determined by the processors.

In some implementations, the processors can create or generate a CSS styling profile for the information resource that includes the DOM elements corresponding to the primary content and styles of properties associated with the DOM elements. The processors can store the generated CSS styling profile in the memory such that when a request to convert a third-party content item to a native ad or native content item, the conversion can occur without requiring any input from the content publisher of the information resource.

The processors can use the stored styles of properties to modify third-party content to be inserted within the information resource (BLOCK 525). In some implementations, the processors can identify a third-party content item to serve at the information resource. In some implementations, the third-party content item is selected from a plurality of third-party content items. In some implementations, the third-party content item is selected responsive to an auction for selecting content to display on the information resource. The processors can identify, from an identifier of the information resource, the stored styles of properties of the DOM elements included in the DOM container of the information resource corresponding to primary content. The processors can generate, from the third-party content item, a DOM node including a plurality of DOM elements that represent the content of the third-party content item. The DOM elements may define styles of properties that match the identified styles of properties of corresponding DOM elements included in the DOM container of the information resource. The processors may then insert the DOM node in a DOM tree of the information resource and provide the DOM tree of the information resource including the DOM node corresponding to the third-party content item to a computing device on which to render the information resource including the generated third-party content item.

In some implementations, the processors can modify third-party content items into native content items that match the look and feel of an information resource for which the processors previously determined the styles of properties of DOM elements corresponding to primary content. The processors can identify a third-party content item to serve on the information resource. In some implementations, the processors can identify the third-party content item by receiving the third-party content item from an advertising auction system. In some implementations, the processors can identify the third-party content item responsive to receiving a request to include the third-party content item on the information resource. For instance, the request can be a request to include an article or post previously displayed on another information resource on the information resource. To maintain the look and feel of the information resource, the article or post may be modified into a native content item before being included in the information resource.

The processors can identify the information resource on which to include the identified third-party content item. The processors can use an identifier of the information resource to perform a lookup in the memory to retrieve the styles of properties of DOM elements of the primary content of the information resource previously determined by the processors.

In some implementations, the processors can retrieve the CSS styling profile of the information resource or some other information that the processors can use to modify the identified third-party content item into a native content item for the information resource on which to serve the third-party content item. In some implementations, the processors can identify the DOM elements of the primary content that may be used to modify the corresponding elements of the third-party content item. In some implementations, the CSS styling profile can identify the DOM elements of the primary content to use for modifying third-party content item. In some implementations, the CSS styling profile can include a DOM element corresponding to a link within a header of an article or post, a DOM element corresponding to text within a body portion of the article or post, and a DOM element corresponding to a link within the body portion of the article or post.

In some implementations, the processors can generate a native ad from a text ad corresponding to a third-party content publisher. In some implementations, the processors can identify the header of the text ad and extract the text and link of the header of the text ad to generate a DOM element corresponding to a header portion of the native ad. In this way, when the native ad is rendered on the information resource, the header of the native ad includes the text of the header of the text ad and a link of the header of the native ad is directed to the same landing page as the link of the header of the text ad. Similarly, the processors can identify the text portion of the text ad and extract the text portion to insert in a corresponding text portion of the native ad. The DOM element of the text portion of the native ad, however, will have the styles of properties of the DOM element of the text portion of the primary content of the information resource. Moreover, the processors can identify the website address portion of the text ad and extract the website address to insert in text portion of the native ad. The DOM element of the portion of the native ad containing the website address, however, will have the styles of properties of the DOM element of a link that may appear in the text portion of the primary content of the information resource.

Once the processors generate the native content item from the identified third-party content item, the processors can insert the native content item in the information resource prior to rendering the information resource to an end user computing device. In some implementations, the processors can modify the DOM tree of the information resource to include a DOM node including a plurality of DOM elements that form the native content item. As described herein, the processors can determine a location in the DOM tree to insert the DOM node corresponding to the native content item. In some implementations, the DOM node can be inserted in the DOM tree such that the native content item is rendered below the first post or article is rendered on the information resource.

In some implementations, the processors can inject a DOM node or element corresponding to the native content item onto the information resource. In some implementations, the native content item can be served using a DOM element styling function.

Figure 6:
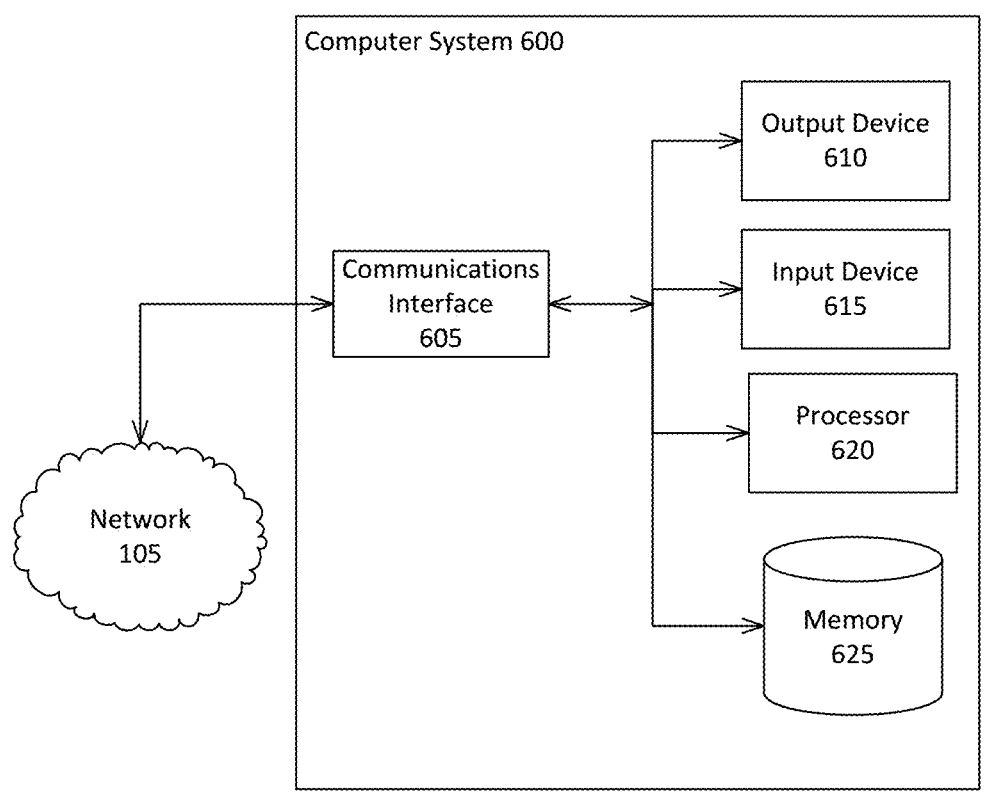
FIG. 6 is a block diagram illustrating an implementation of a general architecture for a computer system that may be employed to implement various elements of the systems and methods described and illustrated herein.

FIG. 6 shows the general architecture of an illustrative computer system 600 that may be employed to implement any of the computer systems discussed herein (including the system 100 and its components such as the primary content detection module 130, the stable identifier generation module 132, the content insertion module 134, the style property detection module 136 and the third-party content modification module 138) in accordance with some implementations. The computer system 600 can be used to provide information via the network 105 for display. The computer system 600 of FIG. 6 comprises one or more processors 620 communicatively coupled to memory 625, one or more communications interfaces 605, and one or more output devices 610 (e.g., one or more display units) and one or more input devices 615. The processors 620 can be included in the data processing system 110 or the other components of the system 100 such as the primary content detection module 130, the stable identifier generation module 132, the content insertion module 134, the style property detection module 136 and the third-party content modification module 138.

In the computer system 600 of FIG. 6, the memory 625 may comprise any computer-readable storage media, and may store computer instructions such as processor-executable instructions for implementing the various functionalities described herein for respective systems, as well as any data relating thereto, generated thereby, or received via the communications interface(s) or input device(s) (if present). Referring again to the system 100 of FIG. 1, the data processing system 110 can include the memory 625 to store information related to identifying primary content on an information resource, one or more stable identifiers, one or more styles of properties of DOM elements of primary content of an information resource and one or more native content items served for display. The memory 625 can include the database 140. The processor(s) 620 shown in FIG. 6 may be used to execute instructions stored in the memory 625 and, in so doing, also may read from or write to the memory various information processed and or generated pursuant to execution of the instructions.

The processor 620 of the computer system 600 shown in FIG. 6 also may be communicatively coupled to or control the communications interface(s) 605 to transmit or receive various information pursuant to execution of instructions. For example, the communications interface(s) 605 may be coupled to a wired or wireless network, bus, or other communication means and may therefore allow the computer system 600 to transmit information to or receive information from other devices (e.g., other computer systems). While not shown explicitly in the system of FIG. 1, one or more communications interfaces facilitate information flow between the components of the system 100. In some implementations, the communications interface(s) may be configured (e.g., via various hardware components or software components) to provide a website as an access portal to at least some aspects of the computer system 600.

Examples of communications interfaces 605 include user interfaces (e.g., web pages), through which the user can communicate with the data processing system 110.

The output devices 610 of the computer system 600 shown in FIG. 6 may be provided, for example, to allow various information to be viewed or otherwise perceived in connection with execution of the instructions. The input device(s) 615 may be provided, for example, to allow a user to make manual adjustments, make selections, enter data, or interact in any of a variety of manners with the processor during execution of the instructions. Additional information relating to a general computer system architecture that may be employed for various systems discussed herein is provided further herein.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on computer storage medium for execution by, or to control the operation of, data processing apparatus. The program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The features disclosed herein may be implemented on a smart television module (or connected television module, hybrid television module, etc.), which may include a processing module configured to integrate interne connectivity with more traditional television programming sources (e.g., received via cable, satellite, over-the-air, or other signals). The smart television module may be physically incorporated into a television set or may include a separate device such as a set-top box, Blu-ray or other digital media player, game console, hotel television system, and other companion device. A smart television module may be configured to allow viewers to search and find videos, movies, photos and other content on the web, on a local cable TV channel, on a satellite TV channel, or stored on a local hard drive. A set-top box (STB) or set-top unit (STU) may include an information appliance device that may contain a tuner and connect to a television set and an external source of signal, turning the signal into content which is then displayed on the television screen or other display device. A smart television module may be configured to provide a home screen or top level screen including icons for a plurality of different applications, such as a web browser and a plurality of streaming media services, a connected cable or satellite media source, other web "channels", etc. The smart television module may further be configured to provide an electronic programming guide to the user. A companion application to the smart television module may be operable on a mobile computing device to provide additional information about available programs to a user, to allow the user to control the smart television module, etc. In alternate implementations, the features may be implemented on a laptop computer or other personal computer, a smartphone, other mobile phone, handheld computer, a tablet PC, or other computing device.

The operations described in this specification can be implemented as operations performed by a data processing apparatus on data stored on one or more computer-readable storage devices or received from other sources.

The terms "data processing apparatus", "data processing system", "user device" or "computing device" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures. The primary content detection module 130, the stable identifier generation module 132, the content insertion module 134, the style property detection module 136 and the third-party content modification module 138 can include or share one or more data processing apparatus, computing devices, or processors.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), for example. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), plasma, or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system such as system 600 or system 100 can include clients and servers. For example, the data processing system 110 can include one or more servers in one or more data centers or server farms. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular implementations of the systems and methods described herein. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In some cases, the actions recited in the claims can be performed in a different order and still achieve desirable results. In addition, the processes depicted in the accompanying figures do not necessarily require the particular order shown, or sequential order, to achieve desirable results.

In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. For example, the primary content detection module 130, the stable identifier generation module 132, the content insertion module 134, the style property detection module 136 and the third-party content modification module 138 can be part of the data processing system 110, a single module, a logic device having one or more processing modules, one or more servers, or part of a search engine.

Having now described some illustrative implementations and implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed only in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation, and references to "an implementation," "some implementations," "an alternate implementation," "various implementation," "one implementation" or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms.

Where technical features in the drawings, detailed description or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. Although the examples provided herein relate to an advertising program, the systems and methods described herein can be applied to any information resource. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A method of detecting styles of properties of elements on information resources, comprising:
   identifying, by one or more processors, from an information resource, a container affecting presentation of at least a portion of primary content of the information resource, the container including one or more elements;
   determining, by the one or more processors, for at least one element of the one or more elements of the container, a style property defined by the at least one element that corresponds to a style property undefined by the container;
   identifying, by the one or more processors, secondary content to be inserted within the primary content; and
   modifying, by the one or more processors, the identified secondary content using the style property defined by the at least one element of the one or more elements included in the container.

2. The method of claim 1, further comprising:
   identifying, by the one or more processors, from a plurality of style properties of the container, the style property undefined by the container; and
   determining, by the one or more processors, from the one or more elements included in the container, the at least one element that defines the style property corresponding to the style property undefined by the container; and
   setting, by the one or more processors, the style property undefined by the container to the style property defined by the at least one element.

3. The method of claim 1, further comprising:
   storing, by the one or more processors onto a database for a plurality of information resources, the style property defined by the at least one element corresponding to the style property undefined by the container, the plurality of information resources each including the primary content of the information resource; and
   identifying, by the one or more processors, a second information resource of the plurality of information resources to which the secondary content is to be inserted, the second information resource different from the information resource, and
   wherein modifying the identified secondary content further comprises modifying the identified secondary content to be inserted into the second information resource using the style property stored for the plurality of information resources.

4. The method of claim 1, further comprising:
   determining, by the one or more processors, that a header element of the primary content of the information resource lacks any links; and
   inserting, by the one or more processors, responsive to determining that the header element lacks any links, a link of one of the one or more elements included in the container identified as affecting the presentation of at least the portion of the primary content.

5. The method of claim 1, wherein modifying the secondary content further comprises:
   generating, for insertion into the primary content, a second container corresponding to the secondary content, the second container including one or more second elements included in the secondary content; and
   setting a style property of at least one of the one or more second elements to the style property of the at least one element of the container.

6. The method of claim 1, wherein modifying the secondary content further comprises:
   identifying a second element of the one or more elements of the container of a same element type as a third element of the secondary content; and
   setting, responsive to identifying the second element as the same element type as the third element, a style property of the second element to a style property of the third element of the secondary content.

7. The method of claim 1, wherein determining the style property further comprises rendering the at least one element of the one or more elements in the container to determine the style property for the at least one element from the rendering.

8. The method of claim 1, further comprising storing, by the one or more processors onto a database, an association between the style property defined by the at least one element and an identifier for the information resource; and
   wherein modifying the secondary content further comprises identifying the style property to apply to the secondary content based on the association between the style property and the identifier for the information resource to which the secondary content is to be inserted.

9. The method of claim 1, further comprising inserting, by the one or more processors, the secondary content into the primary content, responsive to modifying the secondary content using the style property defined by the at least one element.

10. The method of claim 1, further comprising identifying, by the one or more processors, from a content publisher, the information resource for which to detect the style property based on prior insertion of content from a content provider.

11. A system for detecting styles of properties of elements on information resources, comprising:
a data processing system having one or more processors, configured to:
identify, from an information resource, a container affecting presentation of at least a portion of primary content of the information resource, the container including one or more elements;
determine, for at least one element of the one or more elements of the container, a style property defined by the at least one element that corresponds to a style property undefined by the container;
identify secondary content to be inserted within the primary content; and
modify the identified secondary content using the style property defined by the at least one element of the one or more elements included in the container.

12. The system of claim 11, wherein the data processing system is further configured to:
identify, from a plurality of style properties of the container, the style property undefined by the container; and
determine, from the one or more elements included in the container, the at least one element that defines the style property corresponding to the style property undefined by the container; and
set the style property undefined by the container to the style property defined by the at least one element.

13. The system of claim 11, wherein the data processing system is further configured to:
store, onto a database for a plurality of information resources, the style property defined by the at least one element corresponding to the style property undefined by the container, the plurality of information resources each including the primary content of the information resource;
identify a second information resource of the plurality of information resources to which the secondary content is to be inserted, the second information resource different from the information resource; and
modify the identified secondary content to be inserted into the second information resource using the style property stored for the plurality of information resources.

14. The system of claim 11, wherein the data processing system is further configured to:
determine that a header element of the primary content of the information resource lacks any links; and
insert, responsive to determining that the header element lacks any links, a link of one of the one or more elements included in the container identified as affecting the presentation of at least the portion of the primary content.

15. The system of claim 11, wherein the data processing system is further configured to:
generate, for insertion into the primary content, a second container corresponding to the secondary content, the second container including one or more second elements included in the secondary content; and
set a style property of at least one of the one or more second elements to the style property of the at least one element of the container.

16. The system of claim 11, wherein the data processing system is further configured to:
identify a second element of the one or more elements of the container of a same element type as a third element of the secondary content; and
set, responsive to identifying the second element as the same element type as the third element, a style property of the second element to a style property of the third element of the secondary content.

17. The system of claim 11, wherein the data processing system is further configured to rendering the at least one element of the one or more elements in the container to determine the style property for the at least one element from the rendering.

18. The system of claim 11, wherein the data processing system is further configured to:
store, onto a database, an association between the style property defined by the at least one element and an identifier for the information resource; and
identify the style property to apply to the secondary content based on the association between the style property and the identifier for the information resource to which the secondary content is to be inserted.

19. The system of claim 11, wherein the data processing system is further configured to insert the secondary content into the primary content, responsive to modifying the secondary content using the style property defined by the at least one element.

20. The system of claim 11, wherein the data processing system is further configured to identify, from a content publisher, the information resource for which to detect the style property based on prior insertion of content from a content provider.

* * * * *